(12) United States Patent
Geng et al.

(10) Patent No.: US 12,105,260 B2
(45) Date of Patent: Oct. 1, 2024

(54) OPTICAL IMAGING LENS ASSEMBLY

(71) Applicant: Zhejiang Sunny Optics Co., Ltd, Yuyao (CN)

(72) Inventors: Xiaoting Geng, Yuyao (CN); Saifeng Lyu, Yuyao (CN); Tianxiang Xing, Yuyao (CN); Long Li, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 619 days.

(21) Appl. No.: 17/235,893

(22) Filed: Apr. 20, 2021

(65) Prior Publication Data
US 2021/0239947 A1 Aug. 5, 2021

Related U.S. Application Data

(63) Continuation of application No. PCT/CN2019/108451, filed on Sep. 27, 2019.

(30) Foreign Application Priority Data

Feb. 18, 2019 (CN) .......................... 201910123355.2

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ....... G02B 13/0045; G02B 9/64; G02B 13/18
See application file for complete search history.

(56) References Cited

U.S. PATENT DOCUMENTS

| 6,185,050 B1 | 2/2001 | Ota et al. |
| 2009/0052729 A1* | 2/2009 | Bae ...................... H04N 1/0044 382/100 |

(Continued)

FOREIGN PATENT DOCUMENTS

| CN | 203965708 U | 11/2014 |
| CN | 105278074 | 1/2016 |

(Continued)

OTHER PUBLICATIONS

Focal Length Calculator (Published Nov. 24, 2017, retrieved Feb. 22, 2024. Retrieved from Wayback Machine; https://web.archive.org/web/20171124095949/https://channelsystems.ca/calculators/focal-length) (Year: 2017).*

(Continued)

*Primary Examiner* — Joseph P Martinez
*Assistant Examiner* — Ray Alexander Dean
(74) *Attorney, Agent, or Firm* — Barnes & Thornburg LLP

(57) ABSTRACT

The present disclosure discloses an optical imaging lens assembly including, sequentially from an object side to an image side along an optical axis, a first lens having positive refractive power and a concave image-side surface; a second lens having refractive power and a concave image-side surface; a third lens having refractive power; a fourth lens having refractive power; a fifth lens having positive refractive power; a sixth lens having refractive power, a convex object-side surface and a concave image-side surface; and a seventh lens having refractive power and a concave object-side surface. Half of a maximum field-of-view HFOV of the optical imaging lens assembly and a total effective focal length f of the optical imaging lens assembly satisfy: tan (HFOV)*f≥4.34 mm.

17 Claims, 12 Drawing Sheets

(56) References Cited

U.S. PATENT DOCUMENTS

| | | | |
|---|---|---|---|
| 2016/0025953 A1 | 1/2016 | Jung | |
| 2017/0059832 A1 | 3/2017 | Yoshinaga | |
| 2018/0188485 A1* | 7/2018 | Fan | G02B 13/0045 |
| 2018/0259744 A1 | 9/2018 | Pao et al. | |
| 2019/0204554 A1* | 7/2019 | Liu | G02B 9/64 |

FOREIGN PATENT DOCUMENTS

| | | |
|---|---|---|
| CN | 105988193 | 10/2016 |
| CN | 107153257 | 9/2017 |
| CN | 108363180 A | 8/2018 |
| CN | 108873256 | 11/2018 |
| CN | 109613684 A | 4/2019 |
| CN | 209514190 U | 10/2019 |
| JP | 2012220654 A | 11/2012 |
| JP | 2016071115 A | 5/2016 |
| JP | 2016085431 A | 5/2016 |

OTHER PUBLICATIONS

India First Examination Report for Application 202117018938, dated Feb. 11, 2022, 6 pages.

* cited by examiner

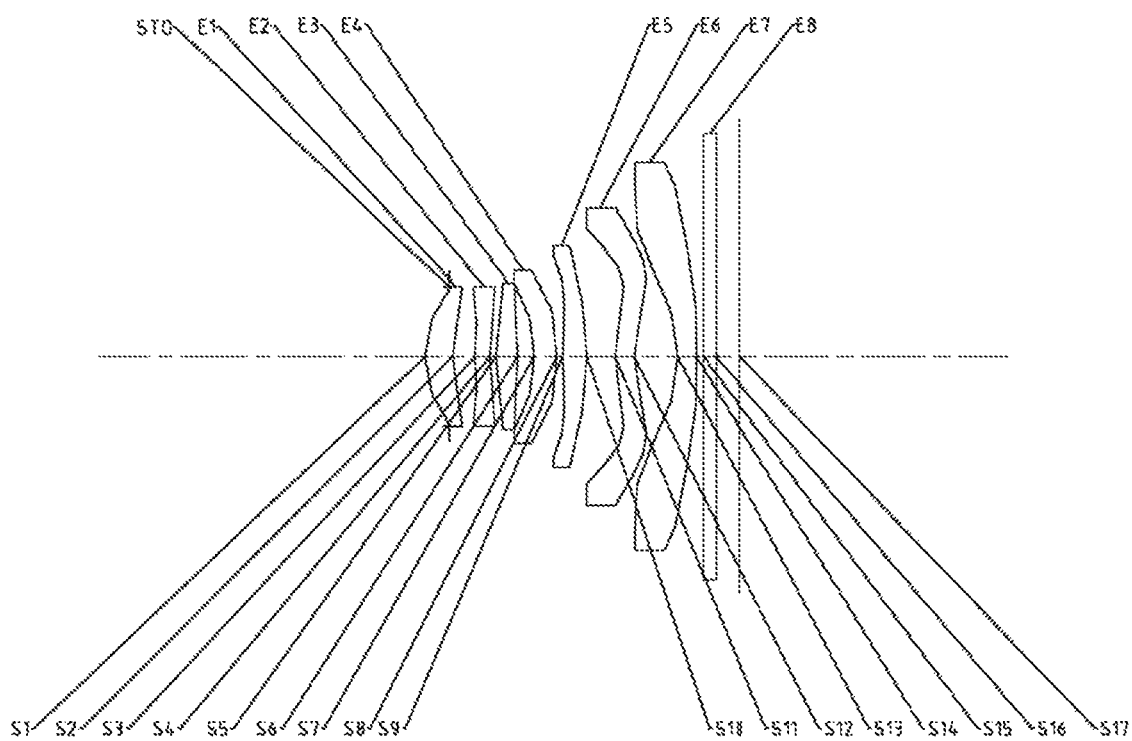
Fig. 5
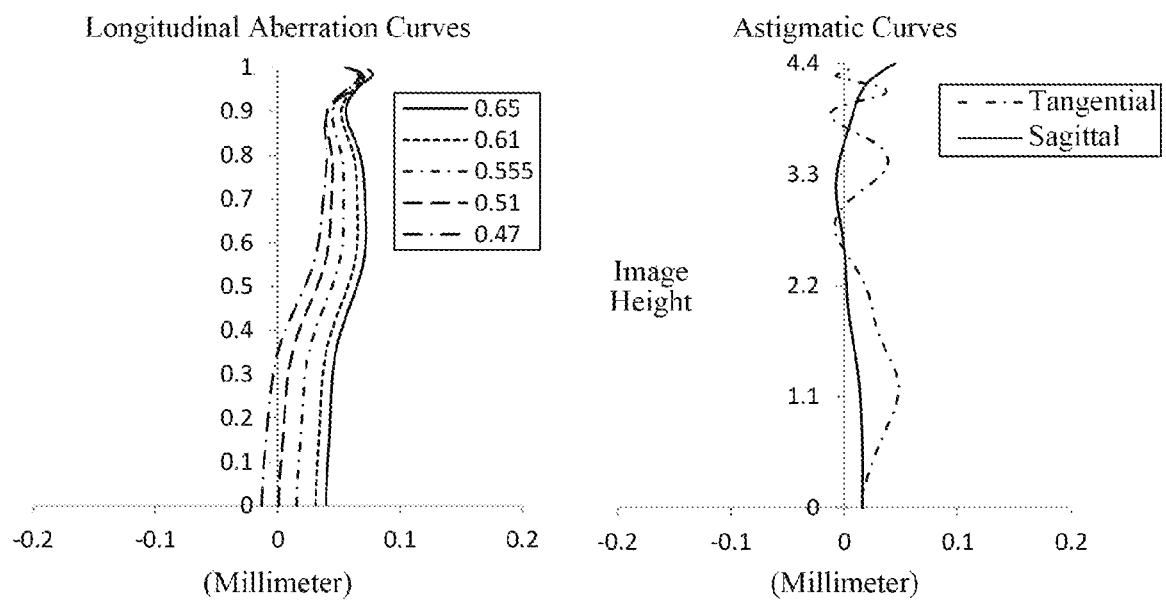
Fig. 6A                                  Fig. 6B

OPTICAL IMAGING LENS ASSEMBLY

CROSS-REFERENCE TO RELATED APPLICATIONS

The present patent application is a continuation of International Application No. PCT/CN2019/108451, filed on Sep. 27, 2019, which claims priority to Chinese Patent Application No. 201910123355.2, filed before the China National Intellectual Property Administration (CNIPA) on Feb. 18, 2019. Both of the aforementioned patent applications are hereby incorporated by reference in their entireties.

TECHNICAL FIELD

The present disclosure relates to an optical imaging lens assembly, and more specifically, relates to an optical imaging lens assembly including seven lenses.

BACKGROUND

In recent years, portable electronic products have developed rapidly, and the pixels of mobile phones have increased rapidly. Mobile phones with main cameras up to 40 million pixels have appeared on the market. At this rate of development, it is imminent for manufacturers to design mobile phones with high imaging quality. In theory, by increasing the number of lenses in the lens assembly to compensate various aberrations with more lenses, the image quality of the lens assembly may be greatly improved. However, if the number of lenses is not limited, the size of the lens assembly will undoubtedly increase, which is contrary to the ultra-thin trend of the portable devices such as mobile phones. Therefore, how to design a lens assembly with high image quality and capable to match a sensor with high pixel and strong image processing technology while keeping the size of the lens assembly unchanged or even smaller has become an urgent problem to be solved at present.

SUMMARY

The present disclosure provides an optical imaging lens assembly that is applicable to portable electronic products and at least solves or partially solves at least one of the above disadvantages of the prior art.

The present disclosure provides an optical imaging lens assembly which may sequentially from an object side to an image side along an optical axis include: a first lens having positive refractive power and a concave image-side surface: a second lens having refractive power and a concave image-side surface: a third lens having refractive power; a fourth lens having refractive power: a fifth lens having positive refractive power: a sixth lens having refractive power, a convex object-side surface and a concave image-side surface; and a seventh lens having refractive power and a concave object-side surface.

In one embodiment, half of a maximum field-of-view HFOV of the optical imaging lens assembly and a total effective focal length f of the optical imaging lens assembly may satisfy: $\tan(HFOV)*f \geq 4.34$ mm.

In one embodiment, a distance TTL along the optical axis from an object-side surface of the first lens to an imaging plane of the optical imaging lens assembly and an effective focal length f1 of the first lens may satisfy: $0.6 < TTL/f1 < 1.3$.

In one embodiment, a total effective focal length f of the optical imaging lens assembly and an entrance pupil diameter EPD of the optical imaging lens assembly may satisfy: $f/EPD \leq 2$.

In one embodiment, a total effective focal length f of the optical imaging lens assembly and an effective focal length f5 of the fifth lens may satisfy: $0 < f/f5 < 1$.

In one embodiment, a total effective focal length f of the optical imaging lens assembly and an effective focal length f7 of the seventh lens may satisfy: $0.5 < |f7/f| < 1.3$.

In one embodiment, a total effective focal length f of the optical imaging lens assembly and a radius of curvature R13 of the object-side surface of the seventh lens may satisfy: $-1.3 < R13/f < -0.3$.

In one embodiment, a radius of curvature R11 of the object-side surface of the sixth lens and a radius of curvature R12 of the image-side surface of the sixth lens may satisfy: $0 < |R11-R12|/|R11+R12| < 0.5$.

In one embodiment, a center thickness CT6 of the sixth lens along the optical axis, a center thickness CT7 of the seventh lens along the optical axis and a spaced interval T67 between the sixth lens and the seventh lens along the optical axis may satisfy: $0.8 < T67/(CT6+CT7) < 1.5$.

In one embodiment, a radius of curvature R1 of an object-side surface of the first lens and a radius of curvature R4 of an image-side surface of the second lens may satisfy: $0.2 < R1/R4 < 0.7$.

In one embodiment, a spaced interval T12 between the first lens and the second lens along the optical axis and a spaced interval T23 between the second lens and the third lens along the optical axis may satisfy: $0 < T23/T12 < 0.7$.

In one embodiment, a maximum effective radius DT21 of an object-side surface of the second lens and a maximum effective radius DT31 of an object-side surface of the third lens may satisfy: $1.01 \leq DT31/DT21 < 1.4$.

In one embodiment, a distance TTL along the optical axis from an object-side surface of the first lens to an imaging plane of the optical imaging lens assembly and half of a diagonal length ImgH of an effective pixel area on the imaging plane of the optical imaging lens assembly may satisfy: $TTL/ImgH \leq 1.33$.

The present disclosure employs seven lenses, and the above optical imaging lens assembly has at least one beneficial effect, such as ultra-thinness, high image quality, large aperture, long focal length, and ease of processing and manufacturing and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 5 illustrates a schematic structural view of an optical imaging lens assembly according to example 3 of the present disclosure:

FIGS. 6A to 6D illustrate longitudinal aberration curves, astigmatic curves, a distortion curve, and a lateral color curve of the optical imaging lens assembly of the example 3, respectively:

DETAILED DESCRIPTION OF EMBODIMENTS

Figure 1:
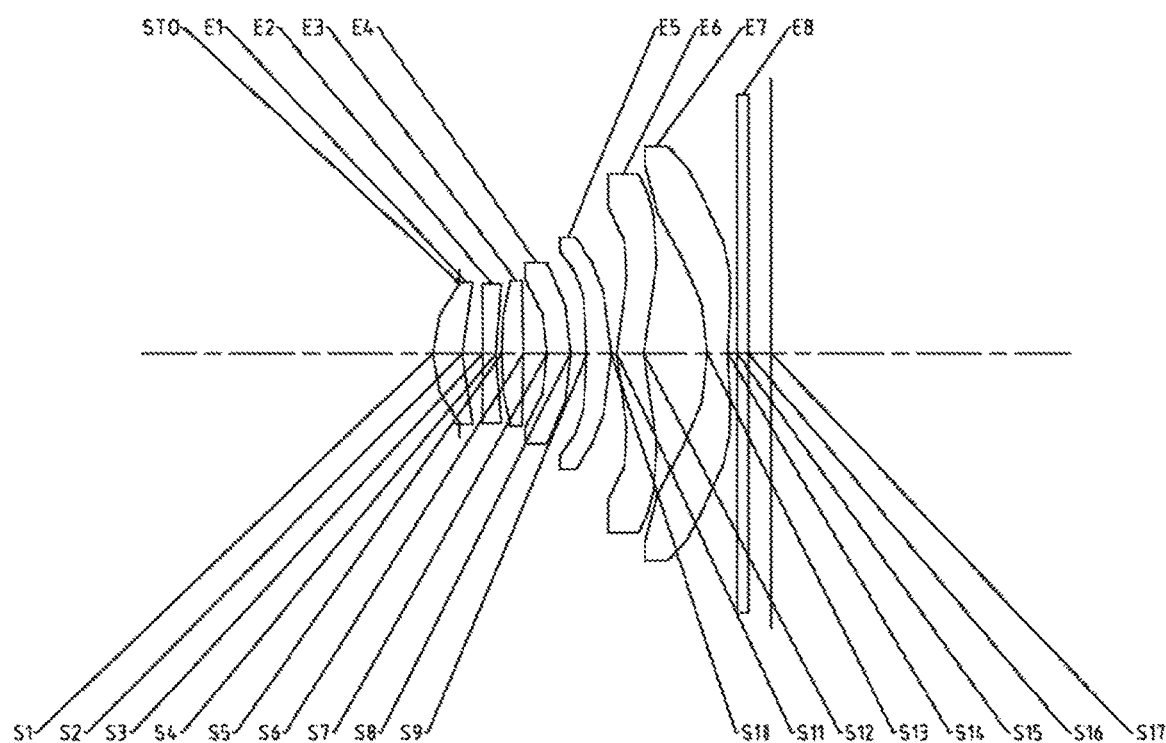
FIG. 1 illustrates a schematic structural view of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, for example, seven lenses having refractive power. The seven lenses are a first lens, a second lens, a third lens, a fourth lens, a fifth lens, a sixth lens and a seventh lens, respectively. The seven lenses are arranged sequentially from an object side to an image side along an optical axis. Among the first lens to the seventh lens, there may be an air interval between each two adjacent lenses.

In an exemplary embodiment, the first lens may have positive refractive power, and an image-side surface thereof may be concave: the second lens has positive or negative refractive power, and an image-side surface thereof may be concave: the third lens has positive or negative refractive power: the fourth lens has positive or negative refractive power: the fifth lens may have positive refractive power: the sixth lens has positive or negative refractive power, an object-side surface thereof may be convex, and an image-side surface thereof may be concave; and the seventh lens has positive or negative refractive power, and an object-side surface thereof may be concave.

The first lens having positive refractive power and concave image-side surface is responsible for light convergence. The first lens cooperates with the 6 rear lenses to maximize the focal length while maintaining the good light convergence of the lens assembly. Meanwhile, this arrangement is also conducive to reducing the size of the lens assembly, so that a lower ratio of TTL and f1 may be obtained.

The image-side surface of the second lens is kept as a concave surface. The effect of setting the image-side surface of the second lens as a concave surface is similar to that of the first lens, which is to make light rays converge when passing through the surface. At the same time, it also helps the system to minimize the value of TTL/f1 under the premise of better image quality.

In an exemplary embodiment, an object-side surface of the first lens may be convex.

In an exemplary embodiment, an object-side surface of the second lens may be convex.

In an exemplary embodiment, the seventh lens may have negative refractive power.

In an exemplary embodiment, the optical imaging lens assembly according to the present disclosure may satisfy: tan(HFOV)*f≥4.34 mm, where HFOV is half of a maximum field-of-view of the optical imaging lens assembly, and f is a total effective focal length of the optical imaging lens assembly. More specifically, HFOV and f may further satisfy: 4.34 mm≤tan(HFOV)*f≤5.0 mm, for example, 4.34 mm≤tan(HFOV)*f≤4.93 mm. When the conditional expression tan(HFOV)*f≥4.34 mm is satisfied, the lens assembly may have a larger imaging plane while maintaining the ultra-thin characteristics, which is beneficial to broaden the using scope of the lens assembly.

In an exemplary embodiment, the optical imaging lens assembly according to the present disclosure may satisfy: 0.6<TTL/f1<1.3, where TTL is a distance along the optical axis from an object-side surface of the first lens to an imaging plane of the optical imaging lens assembly, and f1 is an effective focal length of the first lens. More specifically, TTL and f1 may further satisfy: 0.82≤TTL/f1≤1.01. By controlling the ratio of TTL to f1 in a reasonable range, it is possible to prevent the first lens from assuming too much refractive power, which is beneficial to the distribution of the refractive power of the lens group. Satisfying tan(HFOV) *f≥4.34 mm at the same time may make the lens assembly have a larger imaging plane while maintaining the ultra-thin characteristics.

In an exemplary embodiment, the optical imaging lens assembly according to the present disclosure may satisfy: f/EPD≤2, where f is a total effective focal length of the optical imaging lens assembly, and EPD is an entrance pupil diameter of the optical imaging lens assembly. More specifically, f and EPD may further satisfy: 1.66≤f/EPD≤2.00. By controlling the ratio of f to EPD, the amount of light passing through the lens assembly may be effectively increased, so that the lens assembly has a relatively high relative illumination. That may improve the image quality of the lens assembly in a relatively dark environment and make the lens assembly more practical.

In an exemplary embodiment, the optical imaging lens assembly according to the present disclosure may satisfy: TTL/ImgH≤1.33, where TTL is a distance along the optical axis from an object-side surface of the first lens to an imaging plane of the optical imaging lens assembly, and ImgH is half of a diagonal length of an effective pixel area on the imaging plane of the optical imaging lens assembly. More specifically, TTL and ImgH may further satisfy: 1.21≤TTL/ImgH≤1.33. When this conditional expression is satisfied, the total size of the lens group may be effectively reduced to achieve the ultra-thin characteristics and miniaturization of the lens group, so that the lens group may be better adapted to more and more ultra-thin electronic products on the market.

In an exemplary embodiment, the optical imaging lens assembly according to the present disclosure may satisfy: 0<f/f5<1, where f is a total effective focal length of the optical imaging lens assembly, and f5 is an effective focal length of the fifth lens. More specifically, f and f5 may further satisfy: 0.09≤f/f5≤0.92. By reasonably distributing the effective focal length of the lens group and the effective focal length of the fifth lens, the size of the lens group may be reduced more effectively. Meanwhile, it is beneficial to avoid excessive concentration of the refractive power of the system while maintaining the ultra-thin characteristics. The cooperation of the fifth lens and the front four lenses may make the system aberrations better corrected.

In an exemplary embodiment, the optical imaging lens assembly according to the present disclosure may satisfy: 0.5<|f7/f|<1.3, where f is a total effective focal length of the optical imaging lens assembly, and f7 is an effective focal length of the seventh lens. More specifically, f and f7 may further satisfy: 0.78≤|f7/f|≤1.14. By reasonably distributing the effective focal length of the lens group and the effective focal length of the seventh lens, the lens group may better correct system aberrations while maintaining ultra-thin characteristics. Also, it is beneficial to compensate the aberrations introduced by the front six lenses.

In an exemplary embodiment, the optical imaging lens assembly according to the present disclosure may satisfy: −1.3<R13/f<−0.3, where f is a total effective focal length of the optical imaging lens assembly, and R13 is a radius of curvature of the object-side surface of the seventh lens. More specifically, R13 and f may further satisfy: −1.10≤R13/f≤−0.69. By controlling the ratio of the total effective focal length of the system to the radius of curvature of the object-side surface of the seventh lens in a reasonable range, the lens assembly may be made with better manufacturability while maintaining the miniaturization of the system to facilitate post-processing and mass production, thereby enhancing the practicality of the lens assembly. In addition, while satisfying 0.5<|f7/f|<1.3, the aberrations in the middle field-of-view and the edge field-of-view may be effectively corrected.

In an exemplary embodiment, the optical imaging lens assembly according to the present disclosure may satisfy: 0<|R11−R12|/|R11+R12|<0.5, where R11 is a radius of curvature of the object-side surface of the sixth lens, and R12 is a radius of curvature of the image-side surface of the sixth lens. More specifically, R11 and R12 may further satisfy: 0.03≤|R11−R12|/|R11+R12|≤0.36. It is beneficial to reduce the value of the refractive power near the aperture of the sixth lens. By cooperating with the convex-concave shape of the sixth lens, the sixth lens may effectively converge the light from the edge field-of-view, thereby improving the image quality of the system and the relative illumination of the system. Meanwhile, the sixth lens may maintain good processing technology, thereby improving the practicability of the lens group.

In an exemplary embodiment, the optical imaging lens assembly according to the present disclosure may satisfy: 0.8<T67/(CT6+CT7)<1.5, where CT6 is a center thickness of the sixth lens along the optical axis, CT7 is a center thickness of the seventh lens along the optical axis, and T67 is a spaced interval between the sixth lens and the seventh lens along the optical axis. More specifically, CT6, CT7 and T67 may further satisfy: $1.01 \leq T67/(CT6+CT7) \leq 1.33$. Reasonable control of the thicknesses of the sixth lens and seventh lens and the air interval between the two lenses are beneficial to: 1) make the lens group to better compensate the chromatic aberration of the system and effectively control the distortion of the lens assembly: 2) effectively avoid processing difficulties due to the thinness of the seventh lens: 3) reduce the size of the system and increase the effective focal length of the lens assembly to make the system has a low value of TTL/EFL; and 4) reduce the risk of ghost images between the sixth lens and the seventh lens to make the lens assembly has a better image quality.

In an exemplary embodiment, the optical imaging lens assembly according to the present disclosure may satisfy: $0.2<R1/R4<0.7$, where R1 is a radius of curvature of an object-side surface of the first lens, and R4 is a radius of curvature of an image-side surface of the second lens. More specifically, R1 and R4 may further satisfy: $0.40 \leq R1/R4 \leq 0.61$. By reasonably distributing R1 and R4, the aberration of the entire system may be effectively reduced, and the sensitivity of the system may be reduced. Also, the possibility of poor manufacturability due to too large f1 may be avoided, and the higher sensitivity of the fourth lens due to the excessive inclination angle of the fourth lens may be avoided, which is beneficial to improve the yield rate of the system.

In an exemplary embodiment, the optical imaging lens assembly according to the present disclosure may satisfy: $0<T23/T12<0.7$, where T12 is a spaced interval between the first lens and the second lens along the optical axis, and T23 is a spaced interval between the second lens and the third lens along the optical axis. More specifically, T23 and T12 may further satisfy: $0.28 \leq T23/T12 \leq 0.55$. Controlling the ratio of T23 to T12 within a reasonable range is beneficial to: 1) reduce the size of the system to keep ultra-thin characteristics of the lens assembly: 2) effectively reduce the risk of ghost images between the first lens, the second lens and the third lens to make the lens group have a better image quality; and 3) effectively reduce the distortion of the system.

In an exemplary embodiment, the optical imaging lens assembly according to the present disclosure may satisfy: $1.01 \leq DT31/DT21<1.4$, where DT21 is a maximum effective radius of an object-side surface of the second lens, and DT31 is a maximum effective radius of an object-side surface of the third lens. More specifically, DT21 and DT31 may further satisfy: $1.01 \leq DT31/DT21 \leq 1.09$. Satisfying the conditional expression $1.01 \leq DT31/DT21<1.4$ is beneficial to: 1) increase the height of the imaging plane of the system and increase the effective focal length of the system: 2) enable the system to better compensate the aberration in the center field-of-view; and 3) improve the processability of the second lens and the third lens to make the lens group more practicable.

In an exemplary embodiment, the above optical imaging lens assembly may further include at least one stop. The stop may be disposed at an appropriate position as required, for example, between the object side and the first lens. Optionally, the above optical imaging lens assembly may further include an optical filter for correcting the color deviation and/or a protective glass for protecting the photosensitive element located on an imaging plane.

The optical imaging lens assembly according to the above embodiments of the present disclosure may employ a plurality of lenses, such as seven lenses as described above. By properly configuring the refractive power of each lens, the surface shape, the center thickness of each lens, and spaced intervals along the optical axis between the lenses, the size and the sensitivity of the imaging lens assembly may be effectively reduced, and the workability of the imaging lens assembly may be improved, such that the optical imaging lens assembly is more advantageous for production processing and may be applied to portable electronic products. The present disclosure proposes a solution for a seven-piece lens assembly, which has a relatively small size and relatively high image quality, and is capable of matching a high-pixel sensor and strong image processing technology.

In the embodiments of the present disclosure, at least one of the surfaces of the lenses is aspheric, that is, at least one of the object-side surface and the image-side surface of each of the first lens, the second lens, the third lens, the fourth lens, the fifth lens, the sixth lens and the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, the object-side surface and the image-side surface of each of the first lens, the second lens, the third lens, the fourth lens, the fifth lens, the sixth lens and the seventh lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking seven lenses as an example, the optical imaging lens assembly is not limited to include seven lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 shows a schematic structural view of the optical imaging lens assembly according to example 1 of the present disclosure.

As shown in FIG. 1, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is concave, and an image-side surface S8 thereof is convex. The fifth lens E5 has positive refractive power, an object-side surface S9 thereof is concave, and an image-side surface S10 thereof is convex. The sixth lens E6 has positive refractive power, an object-side surface S11 thereof is convex, and an image-side surface S12 thereof is concave. The seventh lens E7 has negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

Table 1 is a table illustrating basic parameters of the optical imaging lens assembly of example 1, wherein the units for the radius of curvature, the thickness and the focal length are millimeter (mm).

are aspheric. The surface shape x of each aspheric lens may be defined by using, but not limited to, the following aspheric formula:

$$x = \frac{ch^2}{1 + \sqrt{1-(k+1)c^2h^2}} + \sum Aih^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S14 in example 1.

TABLE 1

Example 1: f = 5.16 mm, Fno = 2.00, HFOV = 43.7°, ImgH = 5.00 mm

| Surface number | Surface type | Radius of curvature | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.4862 | | | | |
| S1 | Aspheric | 1.9910 | 0.5397 | 1.55 | 56.11 | 6.63 | 0.2943 |
| S2 | Aspheric | 4.0007 | 0.3726 | | | | 1.5471 |
| S3 | Aspheric | 4.8922 | 0.2400 | 1.67 | 20.37 | −22.00 | 2.9978 |
| S4 | Aspheric | 3.5962 | 0.1032 | | | | 2.1644 |
| S5 | Aspheric | 9.0670 | 0.4000 | 1.55 | 56.11 | 8.91 | 24.9493 |
| S6 | Aspheric | −10.3361 | 0.4354 | | | | −80.0000 |
| S7 | Aspheric | −3.9030 | 0.4262 | 1.68 | 19.25 | −14.33 | 2.1044 |
| S8 | Aspheric | −6.8157 | 0.3083 | | | | 9.4074 |
| S9 | Aspheric | −11.3113 | 0.4500 | 1.61 | 28.31 | 11.00 | 31.7361 |
| S10 | Aspheric | −4.2621 | 0.1000 | | | | −0.5272 |
| S11 | Aspheric | 3.4970 | 0.4935 | 1.67 | 20.37 | 26.25 | 0.5415 |
| S12 | Aspheric | 4.1240 | 1.1617 | | | | −0.2502 |
| S13 | Aspheric | −3.9752 | 0.3798 | 1.62 | 25.92 | −4.54 | −0.3294 |
| S14 | Aspheric | 9.9888 | 0.1666 | | | | −30.9828 |
| S15 | Aspheric | Infinite | 0.2100 | 1.52 | 64.20 | | |
| S16 | Aspheric | Infinite | 0.4132 | | | | |
| S17 | Aspheric | Infinite | Infinite | | | | |

Here, f is a total effective focal length of the optical imaging lens assembly, Fno is an aperture value of the optical imaging lens assembly, HFOV is half of a maximum field-of-view of the optical imaging lens assembly, and ImgH is half of a diagonal length of an effective pixel area on an imaging plane.

In example 1, the object-side surface and the image-side surface of any one of the first lens E1 to the seventh lens E7

TABLE 2

| Surface number | A4 | A6 | A8 | A10 | A12 | A14 | A16 | A18 | A20 |
|---|---|---|---|---|---|---|---|---|---|
| S1 | −4.8762E−03 | 7.4205E−03 | −1.8032E−02 | 2.0414E−02 | −1.4879E−03 | −1.9219E−02 | 1.9478E−02 | −8.0047E−03 | 1.2428E−03 |
| S2 | −1.1238E−02 | −2.7533E−02 | 1.2530E−01 | −3.0985E−01 | 4.6231E−01 | 4.2213E−01 | 2.3000E−01 | −6.8312E−02 | 8.4453E−03 |
| S3 | −9.4076E−02 | 2.1330E−02 | −7.2566E−02 | 1.7203E−01 | −2.1528E−01 | 1.7086E−01 | −8.7177E−02 | 2.6079E−02 | −3.5664E−03 |
| S4 | −7.9834E−02 | 4.7139E−03 | −1.0794E−03 | −1.8864E−02 | 9.1408E−02 | −1.2393E−01 | 8.1606E−02 | −2.7215E−02 | 3.6004E−03 |
| S5 | 1.8516E−03 | 1.6008E−02 | −5.9140E−02 | 1.2229E−01 | −1.6218E−01 | 1.4696E−01 | −8.5976E−02 | 2.9296E−02 | −4.3566E−03 |
| S6 | −1.8125E−02 | 3.6417E−03 | 4.3681E−02 | −9.7294E−02 | 1.2502E−01 | −1.0205E−01 | 5.0656E−02 | −1.3789E−02 | 1.7353E−03 |
| S7 | −6.5384E−02 | 1.6703E−02 | −2.9895E−02 | 1.1066E−01 | −1.7897E−01 | 1.5912E−01 | −8.3172E−02 | 2.3972E−02 | −2.9227E−03 |
| S8 | −5.6700E−02 | −3.9666E−02 | 1.0471E−01 | −1.1920E−01 | 8.9672E−02 | 4.4574E−02 | 1.3666E−02 | −2.2440E−03 | 1.4342E−04 |
| S9 | 1.7896E−02 | −7.5224E−02 | 9.1297E−02 | −7.7054E−02 | 4.4029E−02 | −1.6966E−02 | 4.1026E−03 | −5.4192E−04 | 2.9195E−05 |
| S10 | 1.4225E−02 | −1.9184E−02 | 1.4197E−02 | −7.0583E−03 | 1.8144E−03 | −2.8710E−04 | 6.3263E−05 | −1.3581E−05 | 1.1295E−06 |
| S11 | −1.7088E−02 | −1.5633E−02 | 7.4150E−03 | −1.7649E−03 | 1.8357E−05 | 1.0409E−04 | −2.6123E−05 | 2.7023E−06 | −1.0589E−07 |
| S12 | 1.8057E−02 | −3.2062E−02 | 1.4546E−02 | −4.2370E−03 | 8.1907E−04 | −1.0229E−04 | 7.8817E−06 | −3.3982E−07 | 6.2552E−09 |
| S13 | 9.7692E−03 | −1.6774E−02 | 5.5153E−03 | −7.4768E−04 | 4.3864E−05 | −2.0693E−08 | −1.2055E−07 | 4.3218E−09 | −1.3250E−11 |
| S14 | −3.3666E−03 | −1.0555E−02 | 4.0499E−03 | −9.7740E−04 | 1.6788E−04 | −1.9028E−05 | 1.3150E−06 | −4.9840E−08 | 7.9178E−10 |

Figure 2A:
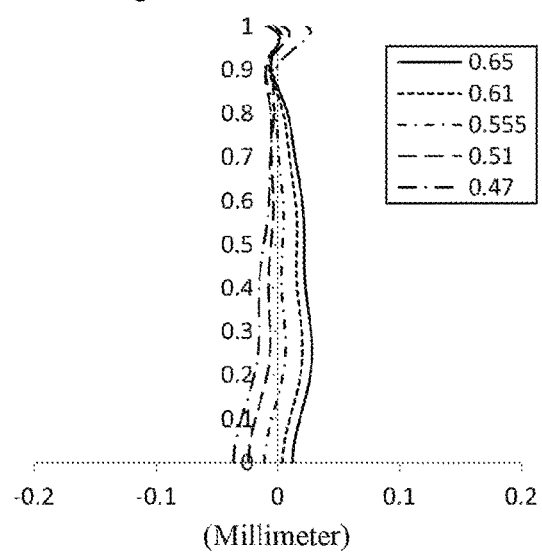
FIGS. 2A to 2D illustrate longitudinal aberration curves, astigmatic curves, a distortion curve, and a lateral color curve of the optical imaging lens assembly of the example 1, respectively.
Figure 2B:
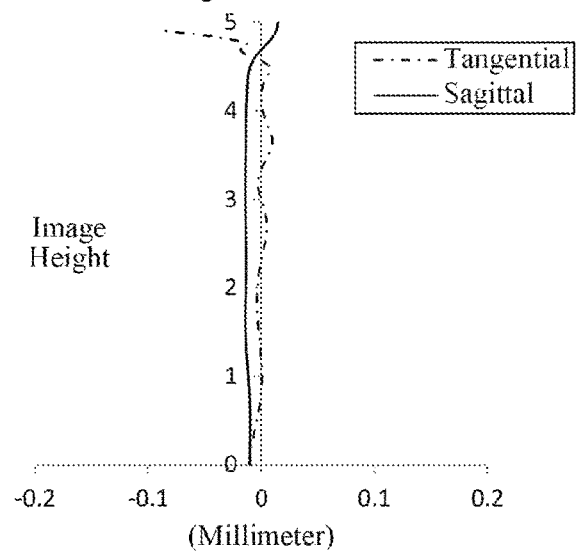
Figure 2C:
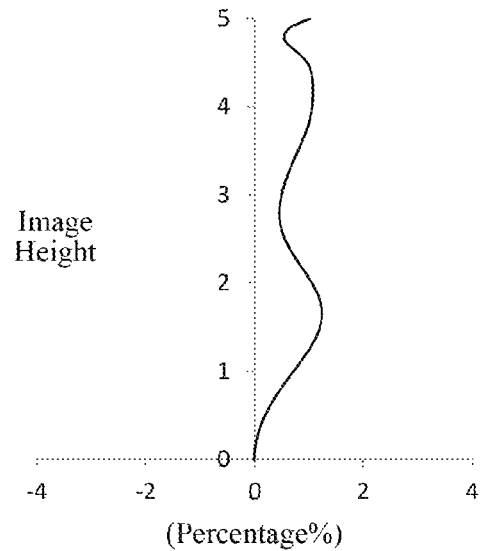
Figure 2D:
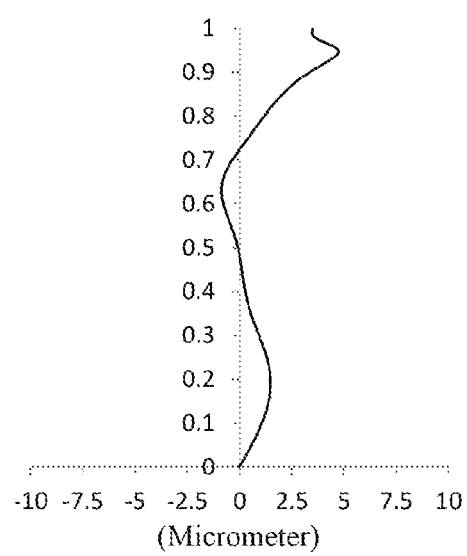

FIG. 2A illustrates longitudinal aberration curves of the optical imaging lens assembly according to example 1, representing the deviations of focal points converged by light of different wavelengths after passing through the lens assembly. FIG. 2B illustrates astigmatic curves of the optical imaging lens assembly according to example 1, representing the curvatures of a tangential plane and the curvatures of a sagittal plane. FIG. 2C illustrates a distortion curve of the optical imaging lens assembly according to example 1, representing the amounts of distortion corresponding to different image heights. FIG. 2D illustrates a lateral color curve of the optical imaging lens assembly according to example 1, representing the deviations of different image heights on an imaging plane after light passes through the lens assembly. It can be seen from FIG. 2A to FIG. 2D that the optical imaging lens assembly provided in example 1 may achieve good image quality.

Example 2

Figure 3:
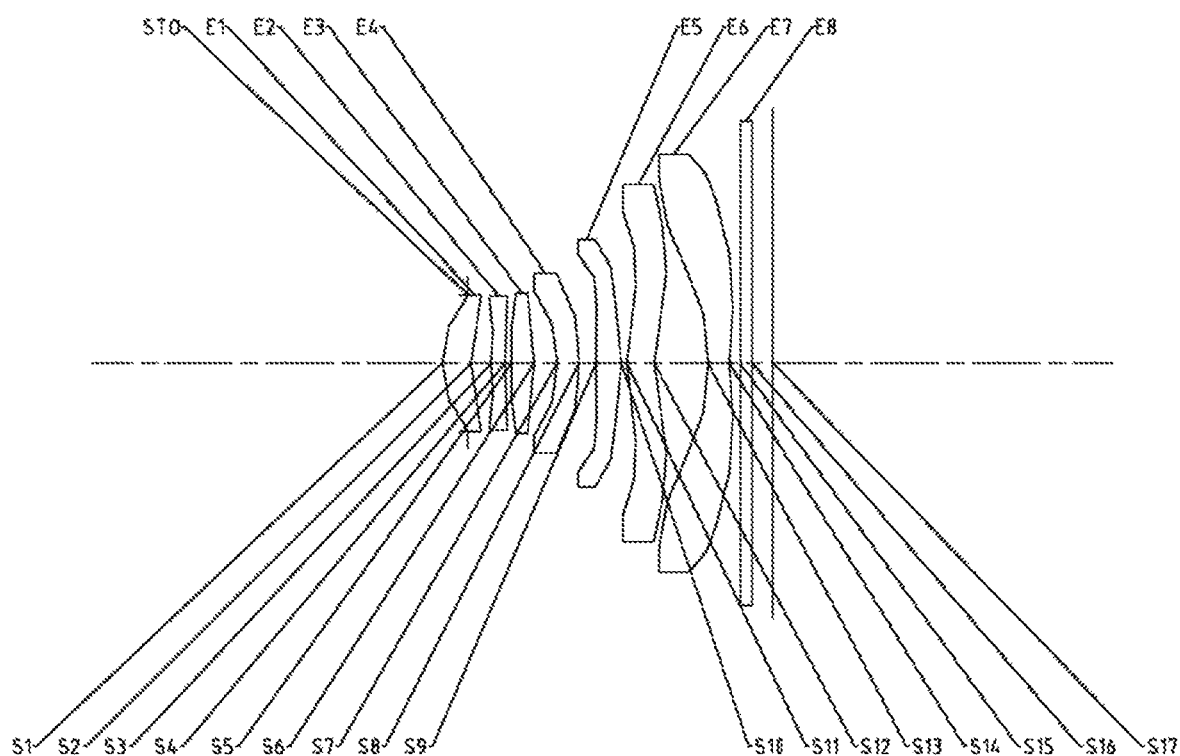
FIG. 3 illustrates a schematic structural view of an optical imaging lens assembly according to example 2 of the present disclosure.

An optical imaging lens assembly according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has positive refractive power, an object-side surface S5 thereof is concave, and an image-side surface S6 thereof is convex. The fourth lens E4 has negative refractive power, an object-side surface S7 thereof is concave, and an image-side surface S8 thereof is convex. The fifth lens E5 has positive refractive power, an object-side surface S9 thereof is convex, and an image-side surface S10 thereof is convex. The sixth lens E6 has negative refractive power, an object-side surface S11 thereof is convex, and an image-side surface S12 thereof is concave. The seventh lens E7 has negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

Table 3 is a table illustrating basic parameters of the optical imaging lens assembly of example 2, wherein the units for the radius of curvature, the thickness and the focal length are millimeter (mm). Table 4 shows high-order coefficients applicable to each aspheric surface in example 2, wherein the surface shape of each aspheric surface may be defined by the formula (1) given in the above example 1.

TABLE 3

Example 2: f = 4.74 mm, Fno = 1.92, HFOV = 43.7°, ImgH = 4.58 mm

| Surface number | Surface type | Radius of curvature | Thickness | Refractive index | Abbe number | Focal length | Conic coefficient |
|---|---|---|---|---|---|---|---|
| OBJ | Spherical | Infinite | Infinite | | | | |
| STO | Spherical | Infinite | −0.4536 | | | | |
| S1 | Aspheric | 1.9355 | 0.5135 | 1.55 | 56.11 | 6.79 | 0.2976 |
| S2 | Aspheric | 3.6690 | 0.3623 | | | | 1.0380 |
| S3 | Aspheric | 4.5593 | 0.2400 | 1.67 | 20.37 | 666.00 | −0.4275 |
| S4 | Aspheric | 4.5096 | 0.1235 | | | | 3.4679 |
| S5 | Aspheric | −24.3762 | 0.3998 | 1.55 | 56.11 | 9.89 | −91.4829 |
| S6 | Aspheric | −4.4472 | 0.4112 | | | | −22.5749 |
| S7 | Aspheric | −3.4134 | 0.3925 | 1.68 | 19.25 | −8.33 | 1.8071 |
| S8 | Aspheric | −9.2730 | 0.3003 | | | | 16.5103 |
| S9 | Aspheric | 674.6646 | 0.4500 | 1.61 | 28.31 | 5.98 | 72.0476 |
| S10 | Aspheric | −3.6488 | 0.1000 | | | | −10.6597 |
| S11 | Aspheric | 3.6577 | 0.4941 | 1.67 | 20.37 | −426.88 | 0.4450 |
| S12 | Aspheric | 3.4162 | 0.9570 | | | | −1.2963 |
| S13 | Aspheric | −5.2214 | 0.3798 | 1.62 | 25.92 | −4.45 | 0.1243 |
| S14 | Aspheric | 5.7590 | 0.1966 | | | | −5.4680 |
| S15 | Aspheric | Infinite | 0.2100 | 1.52 | 64.20 | | |
| S16 | Aspheric | Infinite | 0.3700 | | | | |
| S17 | Aspheric | Infinite | Infinite | | | | |

TABLE 4

| Surface number | A4 | A6 | A8 | A10 | A12 | A14 | A16 | A18 | A20 |
|---|---|---|---|---|---|---|---|---|---|
| S1 | −6.9220E−03 | 1.8797E−02 | −6.5978E−02 | 1.2521E−01 | −1.2946E−01 | 6.8384E−02 | −1.0601E−02 | −4.8453E−03 | 1.6891E−03 |
| S2 | −1.3530E−02 | −3.5778E−02 | 1.4301E−01 | −3.2839E−01 | 4.4203E−01 | −3.3504E−01 | 1.2574E−01 | −1.1743E−02 | −3.3928E−03 |
| S3 | −9.3508E−02 | 9.9802E−03 | −1.8535E−01 | 5.1592E−01 | −8.0703E−01 | 8.4940E−01 | −5.7519E−01 | 2.2236E−01 | −3.7429E−02 |
| S4 | −5.5452E−02 | −5.9281E−02 | 1.5631E−01 | −4.6261E−01 | 9.1891E−01 | −1.0465E+00 | 6.8766E−01 | −2.4370E−01 | 3.5704E−02 |

TABLE 4-continued

| Surface number | A4 | A6 | A8 | A10 | A12 | A14 | A16 | A18 | A20 |
|---|---|---|---|---|---|---|---|---|---|
| S5 | 3.3688E−02 | 3.4050E−03 | 2.2580E−02 | −1.5021E−01 | 3.3237E−01 | −3.8953E−01 | 2.5344E−01 | −8.2929E−02 | 1.0253E−02 |
| S6 | −2.9809E−02 | 2.3245E−02 | −1.5962E−02 | 8.5374E−02 | −2.6692E−01 | 4.0686E−01 | −3.3914E−01 | 1.4833E−01 | −2.6029E−02 |
| S7 | −6.9750E−02 | 3.8655E−02 | −1.1014E−01 | 3.2148E−01 | −5.4601E−01 | 5.4663E−01 | −3.2562E−01 | 1.0750E−01 | −1.5093E−02 |
| S8 | −6.9448E−02 | −3.5400E−02 | 1.2423E−01 | −1.7851E−01 | 1.6399E−01 | −9.7235E−02 | 3.5772E−02 | −7.3165E−03 | 6.2683E−04 |
| S9 | 2.6563E−02 | −4.4213E−02 | 5.8923E−02 | −5.6057E−02 | 3.2982E−02 | −1.2338E−02 | 2.8438E−03 | −3.6905E−04 | 2.0786E−05 |
| S10 | 2.6215E−02 | −4.7472E−03 | 1.4304E−02 | −1.7224E−02 | 9.3204E−03 | −2.9198E−03 | 5.4765E−04 | −5.7156E−05 | 2.5568E−06 |
| S11 | −1.6852E−02 | −1.9786E−02 | 1.0506E−02 | −2.9203E−03 | 4.6410E−04 | −3.2704E−05 | −1.2425E−06 | 3.5792E−07 | −1.6908E−08 |
| S12 | 1.1740E−03 | −3.0690E−02 | 1.6154E−02 | −4.9877E−03 | 1.0018E−03 | −1.2884E−04 | 1.0144E−05 | −4.4410E−07 | 8.2747E−09 |
| S13 | 6.6498E−03 | −2.4500E−02 | 9.6657E−03 | −1.4892E−03 | 7.6480E−05 | 6.5346E−06 | −1.1681E−06 | 6.4066E−08 | −1.2740E−09 |
| S14 | −1.4096E−02 | −9.4011E−03 | 3.7642E−03 | −6.6662E−04 | 7.6204E−05 | −6.3863E−06 | 3.8241E−07 | −1.4015E−08 | 2.2654E−10 |

Figure 4A:
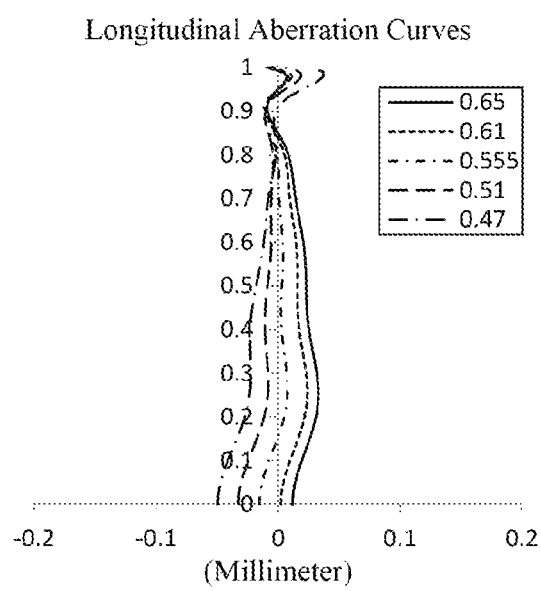
FIGS. 4A to 4D illustrate longitudinal aberration curves, astigmatic curves, a distortion curve, and a lateral color curve of the optical imaging lens assembly of the example 2, respectively.
Figure 4B:
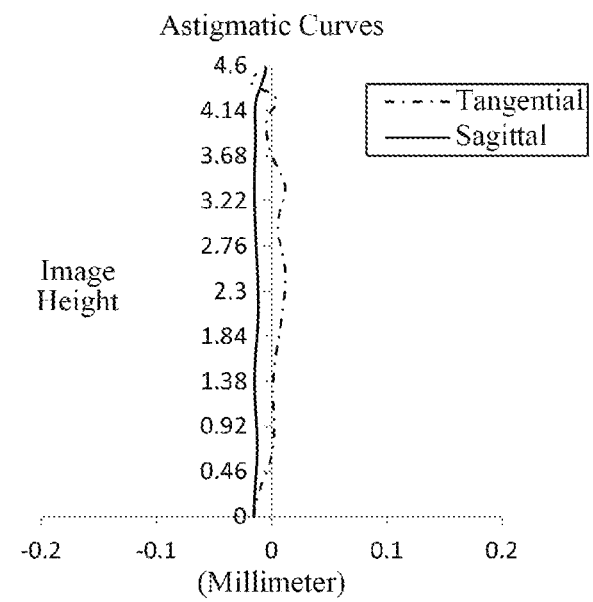
Figure 4C:
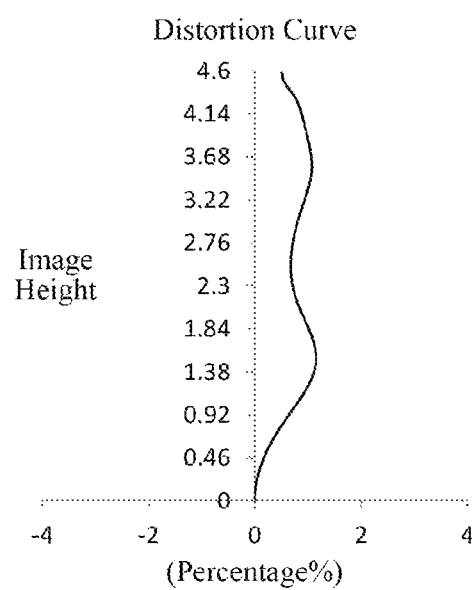
Figure 4D:
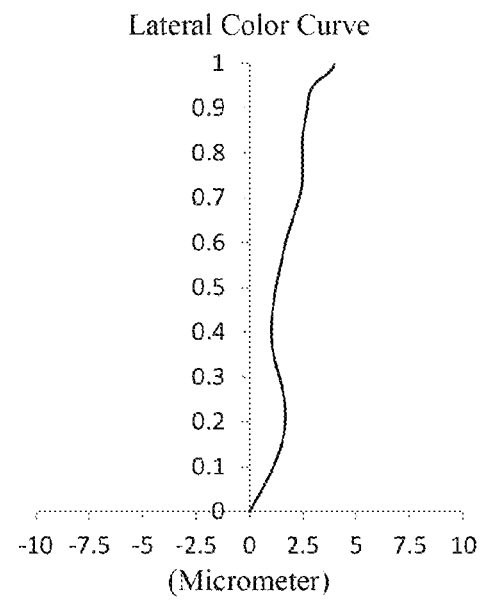

FIG. 4A illustrates longitudinal aberration curves of the optical imaging lens assembly according to example 2, representing the deviations of focal points converged by light of different wavelengths after passing through the lens assembly. FIG. 4B illustrates astigmatic curves of the optical imaging lens assembly according to example 2, representing the curvatures of a tangential plane and the curvatures of a sagittal plane. FIG. 4C illustrates a distortion curve of the optical imaging lens assembly according to example 2, representing the amounts of distortion corresponding to different image heights. FIG. 4D illustrates a lateral color curve of the optical imaging lens assembly according to example 2, representing the deviations of different image heights on an imaging plane after light passes through the lens assembly. It can be seen from FIG. 4A to FIG. 4D that the optical imaging lens assembly provided in example 2 may achieve good image quality.

Example 3

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is concave, and an image-side surface S8 thereof is convex. The fifth lens E5 has positive refractive power, an object-side surface S9 thereof is convex, and an image-side surface S10 thereof is convex. The sixth lens E6 has negative refractive power, an object-side surface S11 thereof is convex, and an image-side surface S12 thereof is concave. The seventh lens E7 has negative refractive power, an object-side surface S13 thereof is concave, and an image-side surface S14 thereof is convex. The optical filter E8 has an object-side surface S15 and an image-side surface S16. Light from an object sequentially passes through the respective surfaces S1 to S16 and is finally imaged on the imaging plane S17.

Table 5 is a table illustrating basic parameters of the optical imaging lens assembly of example 3, wherein the units for the radius of curvature, the thickness and the focal length are millimeter (mm). Table 6 shows high-order coefficients applicable to each aspheric surface in example 3, wherein the surface shape of each aspheric surface may be defined by the formula (1) given in the above example 1.

TABLE 5

Example 3: f = 4.63 mm, Fno = 1.80, HFOV = 43.9°, ImgH = 4.40 mm

| Surface number | Surface type | Radius of curvature | Thickness | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.4454 | | | | |
| S1 | Aspheric | 2.0404 | 0.5129 | 1.55 | 56.11 | 7.12 | 0.2704 |
| S2 | Aspheric | 3.9142 | 0.4112 | | | | 0.2749 |
| S3 | Aspheric | 4.3948 | 0.2765 | 1.67 | 20.37 | −23.24 | −4.1010 |
| S4 | Aspheric | 3.3487 | 0.1159 | | | | 0.2729 |
| S5 | Aspheric | 8.1960 | 0.4000 | 1.55 | 56.11 | 9.31 | −1.1709 |
| S6 | Aspheric | −13.1580 | 0.3038 | | | | 61.4065 |
| S7 | Aspheric | −3.3964 | 0.4223 | 1.68 | 19.25 | −9.88 | 0.3434 |
| S8 | Aspheric | −7.3628 | 0.1074 | | | | 18.9398 |
| S9 | Aspheric | 8.3244 | 0.4500 | 1.61 | 28.31 | 5.03 | −18.9817 |
| S10 | Aspheric | −4.7275 | 0.5272 | | | | −63.7943 |
| S11 | Aspheric | 2.3950 | 0.3511 | 1.67 | 20.37 | −64.26 | −5.7946 |
| S12 | Aspheric | 2.1352 | 0.8051 | | | | −6.0874 |
| S13 | Aspheric | −3.1727 | 0.3500 | 1.62 | 25.92 | −5.27 | −1.2480 |
| S14 | Aspheric | −400.0000 | 0.1308 | | | | −80.0000 |
| S15 | Aspheric | Infinite | 0.2343 | 1.52 | 64.20 | | |

TABLE 5-continued

Example 3: f = 4.63 mm, Fno = 1.80, HFOV = 43.9°, ImgH = 4.40 mm

| Surface number | Surface type | Radius of curvature | Thickness | Material Refractive index | Abbe number | Focal length | Conic coefficient |
|---|---|---|---|---|---|---|---|
| S16 | Aspheric | Infinite | 0.4350 | | | | |
| S17 | Aspheric | Infinite | Infinite | | | | |

TABLE 6

| Surface number | A4 | A6 | A8 | A10 | A12 | A14 | A16 | A18 | A20 |
|---|---|---|---|---|---|---|---|---|---|
| S1  | −4.8664E−03 | −2.8925E−03 | 1.2974E−02 | −3.2017E−02 | 5.3838E−02 | −5.5334E−02 | 3.2888E−02 | −1.0219E−02 | 1.2604E−03 |
| S2  | −1.1626E−02 | −4.3390E−02 | 1.9539E−01 | −4.8488E−01 | 7.2849E−01 | −6.7133E−01 | 3.6931E−01 | −1.1089E−01 | 1.3876E−02 |
| S3  | −8.1632E−02 | −6.0587E−03 | −5.3651E−03 | 7.1243E−02 | −1.5741E−01 | 1.8687E−01 | −1.2711E−01 | 4.6173E−02 | −7.0589E−03 |
| S4  | −7.2079E−02 | −3.2309E−03 | −2.8217E−02 | 1.0753E−01 | −1.5381E−01 | 1.3619E−01 | −7.5451E−02 | 2.3372E−02 | −3.1274E−03 |
| S5  | −5.4320E−03 | 1.0978E−02 | −8.5857E−02 | 1.9161E−01 | −2.3774E−01 | 1.8822E−01 | −9.3570E−02 | 2.7248E−02 | −3.5904E−03 |
| S6  | −1.8450E−02 | −1.9538E−02 | 9.2408E−02 | −1.8334E−01 | 2.1676E−01 | −1.4893E−01 | 5.2866E−02 | −6.2305E−03 | −4.5696E−04 |
| S7  | −2.5005E−02 | −1.3296E−01 | 4.4128E−01 | −7.5330E−01 | 8.2776E−01 | −5.9061E−01 | 2.5954E−01 | −6.3163E−02 | 6.4831E−03 |
| S8  | −8.8758E−02 | −1.8051E−03 | 8.1985E−02 | −1.0869E−01 | 9.6908E−02 | −6.1203E−02 | 2.4435E−02 | −5.3608E−03 | 4.8984E−04 |
| S9  | −2.7254E−02 | −6.9672E−03 | −1.6840E−03 | 1.8041E−02 | −1.9265E−02 | 9.7839E−03 | −2.8416E−03 | 4.6572E−04 | −3.3303E−05 |
| S10 | −2.2137E−02 | 3.2554E−02 | −4.8158E−02 | 3.9056E−02 | −1.8757E−02 | 5.4699E−03 | −9.5860E−04 | 9.5454E−05 | −4.3001E−06 |
| S11 | −3.2521E−02 | −1.5122E−02 | 2.0028E−02 | −2.0162E−02 | 1.1197E−02 | −3.5303E−03 | 6.3422E−04 | −6.0255E−05 | 2.3463E−06 |
| S12 | −2.4738E−02 | 6.5119E−03 | −1.2699E−02 | 7.3995E−03 | −2.2657E−03 | 4.0902E−04 | −4.3180E−05 | 2.4474E−06 | −5.7144E−08 |
| S13 | −3.5482E−02 | 1.7490E−02 | −4.9314E−03 | 1.3802E−03 | −2.9504E−04 | 4.0866E−05 | −3.4578E−06 | 1.6332E−07 | −3.3116E−09 |
| S14 | −2.7084E−02 | 8.5246E−03 | −2.5716E−03 | 7.4588E−04 | −1.4786E−04 | 1.7863E−05 | −1.2667E−06 | 4.8683E−08 | −7.8598E−10 |

Figure 6C:
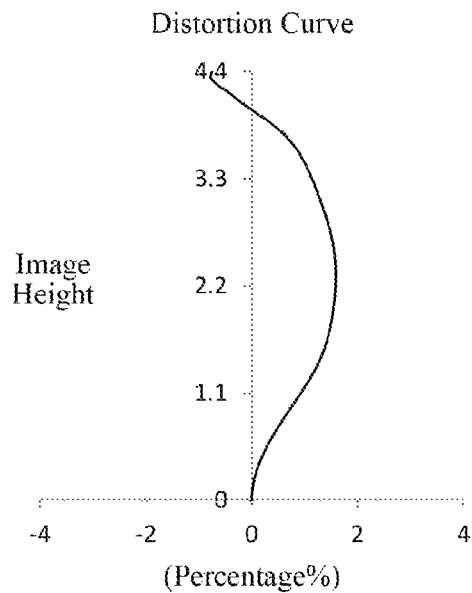
Figure 6D:
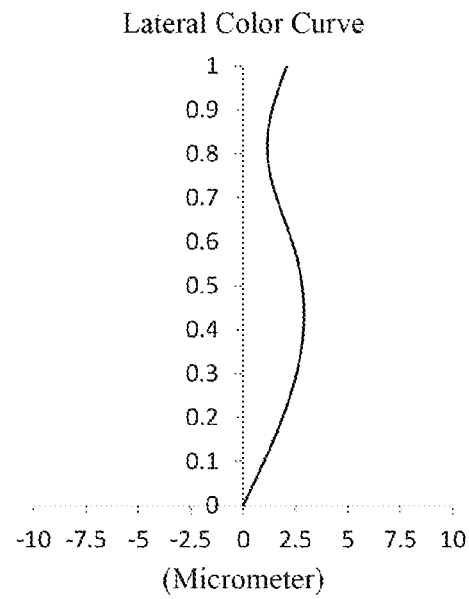

FIG. 6A illustrates longitudinal aberration curves of the optical imaging lens assembly according to example 3, representing the deviations of focal points converged by light of different wavelengths after passing through the lens assembly. FIG. 6B illustrates astigmatic curves of the optical imaging lens assembly according to example 3, representing the curvatures of a tangential plane and the curvatures of a sagittal plane. FIG. 6C illustrates a distortion curve of the optical imaging lens assembly according to example 3, representing the amounts of distortion corresponding to different image heights. FIG. 6D illustrates a lateral color curve of the optical imaging lens assembly according to example 3, representing the deviations of different image heights on an imaging plane after light passes through the lens assembly. It can be seen from FIG. 6A to FIG. 6D that the optical imaging lens assembly provided in example 3 may achieve good image quality.

Example 4

Figure 7:
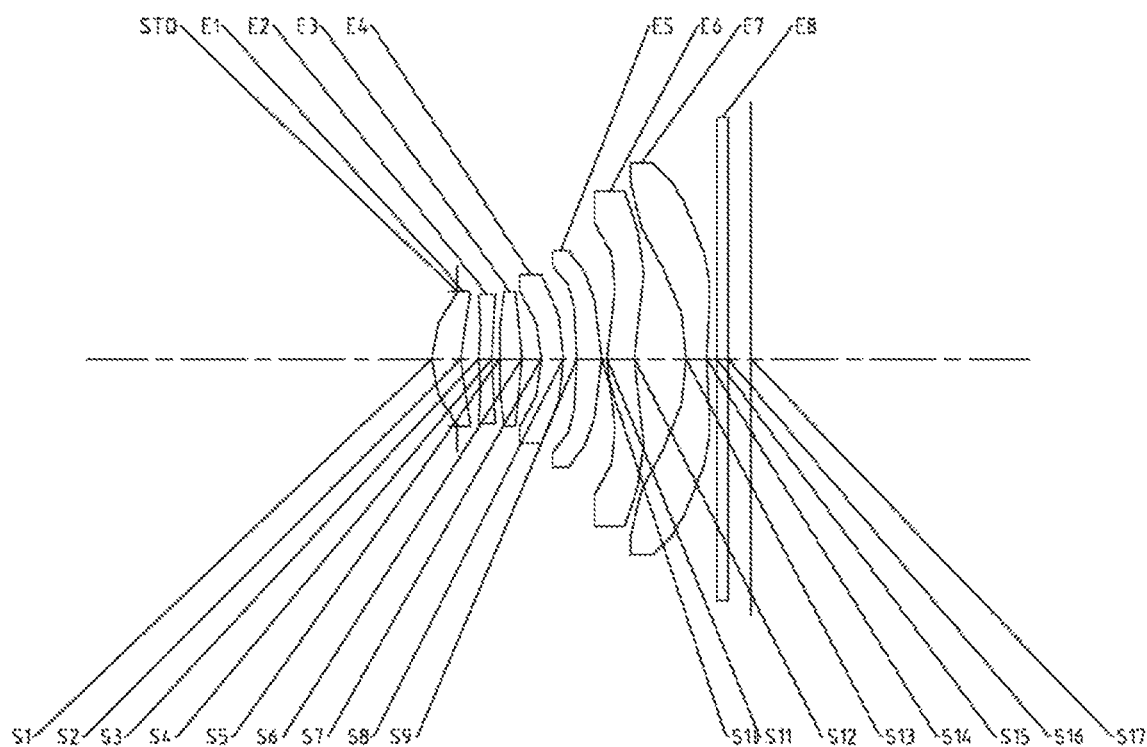
FIG. 7 illustrates a schematic structural view of an optical imaging lens assembly according to example 4 of the present disclosure.

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has positive refractive power, an object-side surface S5 thereof is concave, and an image-side surface S6 thereof is convex. The fourth lens E4 has negative refractive power, an object-side surface S7 thereof is concave, and an image-side surface S8 thereof is convex. The fifth lens E5 has positive refractive power, an object-side surface S9 thereof is concave, and an image-side surface S10 thereof is convex. The sixth lens E6 has positive refractive power, an object-side surface S11 thereof is convex, and an image-side surface S12 thereof is concave. The seventh lens E7 has negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

Table 7 is a table illustrating basic parameters of the optical imaging lens assembly of example 4, wherein the units for the radius of curvature, the thickness and the focal length are millimeter (mm). Table 8 shows high-order coefficients applicable to each aspheric surface in example 4, wherein the surface shape of each aspheric surface may be defined by the formula (1) given in the above example 1.

TABLE 7

Example 4: f = 4.79 mm, Fno = 1.95, HFOV = 44.0°, ImgH = 4.68 mm

| Surface number | Surface type | Radius of curvature | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.4607 | | | | |
| S1 | Aspheric | 1.8826 | 0.5274 | 1.55 | 56.11 | 6.52 | 0.2736 |
| S2 | Aspheric | 3.6039 | 0.3248 | | | | 0.5960 |
| S3 | Aspheric | 3.7908 | 0.2400 | 1.67 | 20.37 | 600.00 | −0.2282 |
| S4 | Aspheric | 3.7301 | 0.1498 | | | | 2.6372 |
| S5 | Aspheric | −242.3140 | 0.4000 | 1.55 | 56.11 | 9.11 | −80.0000 |
| S6 | Aspheric | −4.8743 | 0.3573 | | | | −18.1378 |
| S7 | Aspheric | −2.9022 | 0.4024 | 1.68 | 19.25 | −9.66 | 1.1557 |
| S8 | Aspheric | −5.5771 | 0.2500 | | | | 7.4849 |
| S9 | Aspheric | −10.5605 | 0.4500 | 1.61 | 28.31 | 10.80 | 34.2638 |
| S10 | Aspheric | −4.1108 | 0.1000 | | | | −2.3621 |
| S11 | Aspheric | 3.3949 | 0.5000 | 1.67 | 20.37 | 19.25 | 0.6395 |
| S12 | Aspheric | 4.3446 | 0.9452 | | | | −0.1282 |
| S13 | Aspheric | −4.2009 | 0.3798 | 1.62 | 25.92 | −4.28 | −0.2133 |
| S14 | Aspheric | 7.0230 | 0.1835 | | | | −16.7852 |
| S15 | Aspheric | Infinite | 0.2100 | 1.52 | 64.20 | | |
| S16 | Aspheric | Infinite | 0.4100 | | | | |
| S17 | Aspheric | Infinite | Infinite | | | | |

TABLE 8

| Surface number | A4 | A6 | A8 | A10 | A12 | A14 | A16 | A18 | A20 |
|---|---|---|---|---|---|---|---|---|---|
| S1 | −6.9970E−03 | 1.6579E−02 | −6.4940E−02 | 1.4062E−01 | −1.7804E−01 | 1.3455E−01 | −5.8346E−02 | 1.2969E−02 | −1.0303E−03 |
| S2 | −1.7547E−02 | −3.4413E−02 | 1.5492E−01 | −3.9478E−01 | 5.9935E−01 | −5.3807E−01 | 2.7350E−01 | −6.8621E−02 | 5.5634E−03 |
| S3 | −9.4312E−02 | 1.2733E−02 | −1.9705E−01 | 5.7364E−01 | −9.5188E−01 | 1.0487E+00 | −7.3271E−01 | 2.8969E−01 | −4.9588E−02 |
| S4 | −6.2496E−02 | −6.3174E−02 | 1.7799E−01 | −5.3108E−01 | 1.0756E+00 | −1.2625E+00 | 8.5875E−01 | −3.1600E−01 | 4.8168E−02 |
| S5 | 2.1209E−02 | −2.0850E−03 | 3.5558E−02 | −1.5703E−01 | 3.3935E−01 | −3.9710E−01 | 2.5689E−01 | −8.1887E−02 | 9.3602E−03 |
| S6 | −3.1371E−02 | 3.7085E−02 | −1.1401E−01 | 3.8417E−01 | −7.9824E−01 | 9.9474E−01 | −7.3710E−01 | 2.9928E−01 | −5.0229E−02 |
| S7 | −7.3168E−02 | 5.1194E−02 | −1.5707E−01 | 4.9876E−01 | −9.0352E−01 | 9.6753E−01 | −6.2035E−01 | 2.2147E−01 | −3.3775E−02 |
| S8 | −6.2021E−02 | −5.2886E−02 | 1.7572E−01 | −2.5602E−01 | 2.5203E−01 | −1.6641E−01 | 6.9237E−02 | −1.6047E−02 | 1.5541E−03 |
| S9 | 3.5044E−02 | −1.0639E−01 | 1.4899E−01 | −1.5138E−01 | 1.0657E−01 | −5.1495E−02 | 1.6050E−02 | −2.8786E−03 | 2.2578E−04 |
| S10 | 2.0766E−02 | −2.6001E−02 | 2.6488E−02 | −1.9597E−02 | 8.7226E−03 | −2.6016E−03 | 5.5214E−04 | −7.7167E−05 | 5.1454E−06 |
| S11 | −3.2012E−02 | −1.6769E−02 | 1.0716E−02 | −3.0231E−03 | 3.8638E−05 | 2.2875E−04 | −6.5501E−05 | 7.7546E−06 | −3.4810E−07 |
| S12 | 1.6675E−02 | −4.3285E−02 | 2.3297E−02 | −7.8608E−03 | 1.7429E−03 | −2.4800E−04 | 2.1670E−05 | −1.0565E−06 | 2.1981E−08 |
| S13 | 9.9941E−03 | −2.3687E−02 | 8.8060E−03 | −1.2839E−03 | 5.7151E−05 | 6.9550E−06 | −1.1274E−06 | 6.2123E−08 | −1.2696E−09 |
| S14 | −1.1094E−02 | −1.0016E−02 | 4.3420E−03 | −1.0323E−03 | 1.7831E−04 | −2.1665E−05 | 1.6671E−06 | −7.1321E−08 | 1.2815E−09 |

Figure 8A:
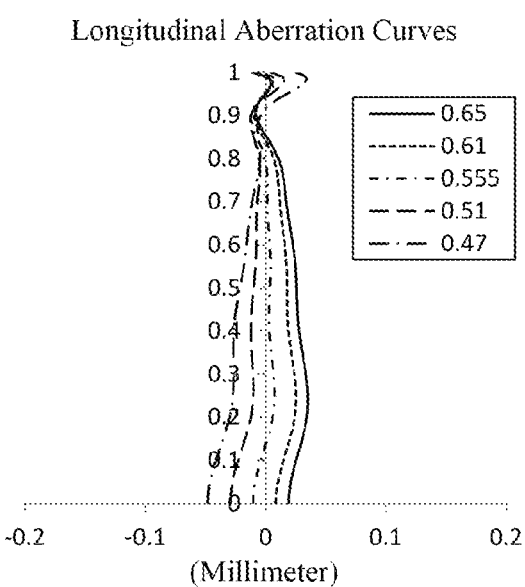
FIGS. 8A to 8D illustrate longitudinal aberration curves, astigmatic curves, a distortion curve, and a lateral color curve of the optical imaging lens assembly of the example 4, respectively.
Figure 8B:
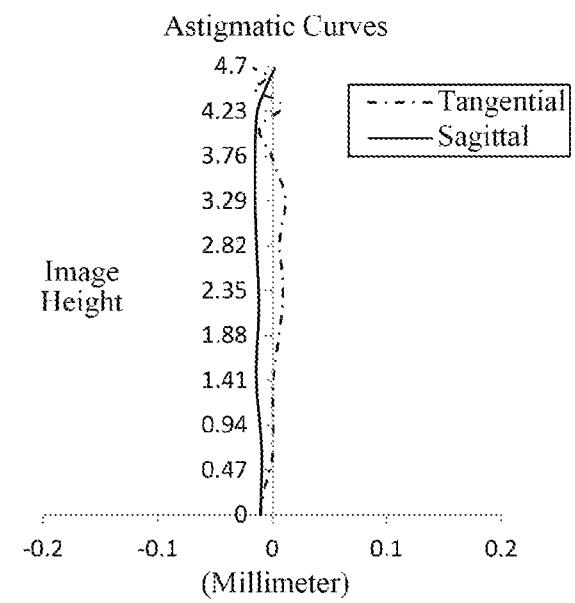
Figure 8C:
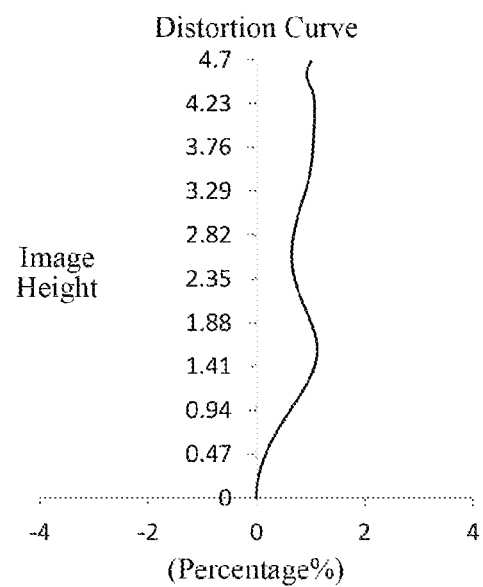
Figure 8D:
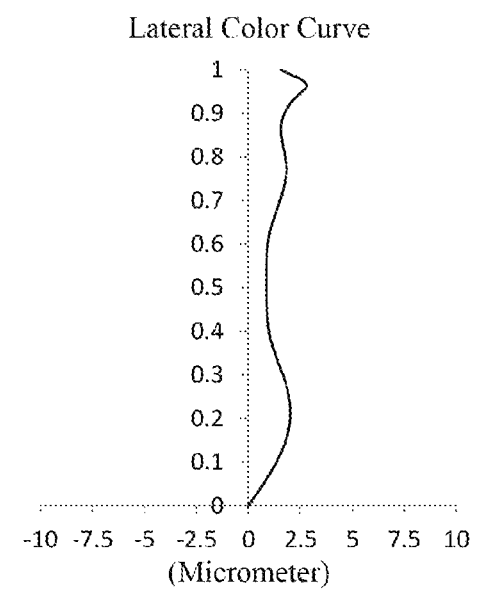

FIG. 8A illustrates longitudinal aberration curves of the optical imaging lens assembly according to example 4, representing the deviations of focal points converged by light of different wavelengths after passing through the lens assembly. FIG. 8B illustrates astigmatic curves of the optical imaging lens assembly according to example 4, representing the curvatures of a tangential plane and the curvatures of a sagittal plane. FIG. 8C illustrates a distortion curve of the optical imaging lens assembly according to example 4, representing the amounts of distortion corresponding to different image heights. FIG. 8D illustrates a lateral color curve of the optical imaging lens assembly according to example 4, representing the deviations of different image heights on an imaging plane after light passes through the lens assembly. It can be seen from FIG. 8A to FIG. 8D that the optical imaging lens assembly provided in example 4 may achieve good image quality.

Example 5

Figure 9:
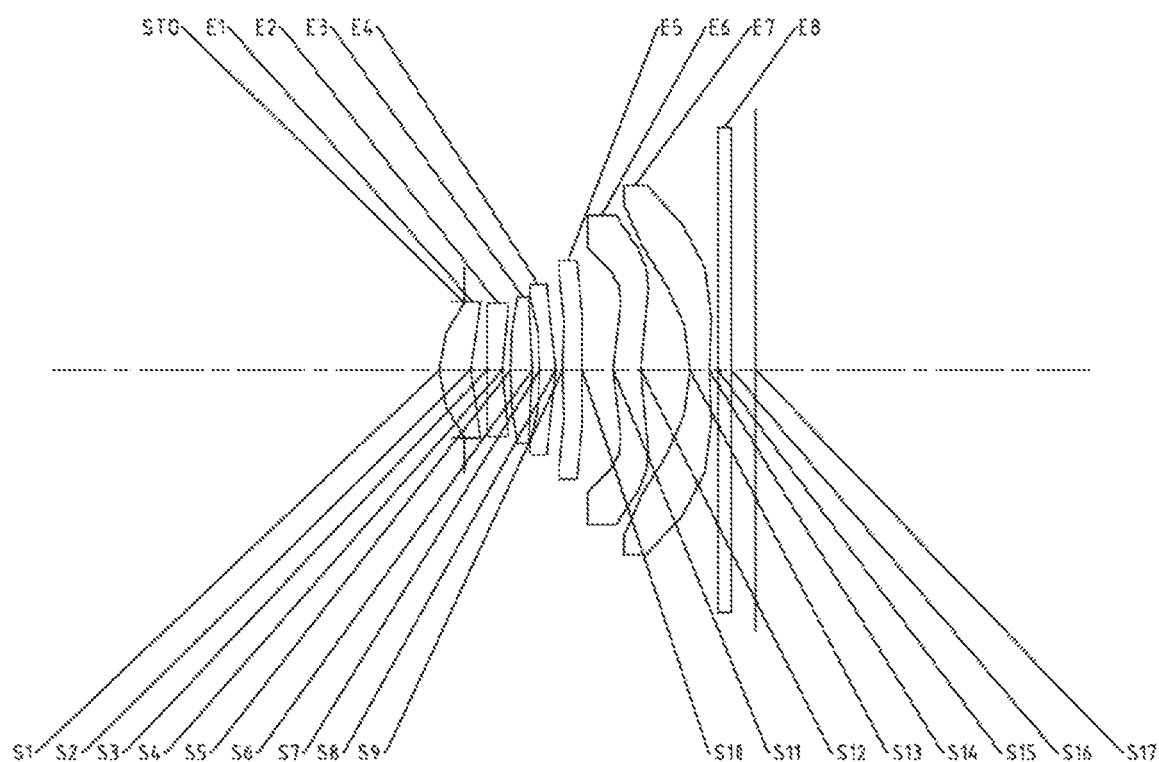
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has positive refractive power, an object-side surface S7 thereof is concave, and an image-side surface S8 thereof is convex. The fifth lens E5 has positive refractive power, an object-side surface S9 thereof is convex, and an image-side surface S10 thereof is concave. The sixth lens E6 has positive refractive power, an object-side surface S11 thereof is convex, and an image-side surface S12 thereof is concave. The seventh lens E7 has negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

Table 9 is a table illustrating basic parameters of the optical imaging lens assembly of example 5, wherein the units for the radius of curvature, the thickness and the focal length are millimeter (mm). Table 10 shows high-order coefficients applicable to each aspheric surface in example 5, wherein the surface shape of each aspheric surface may be defined by the formula (1) given in the above example 1.

passes through the lens assembly. It can be seen from FIG. 10A to FIG. 10D that the optical imaging lens assembly provided in example 5 may achieve good image quality.

Example 6

Figure 11:
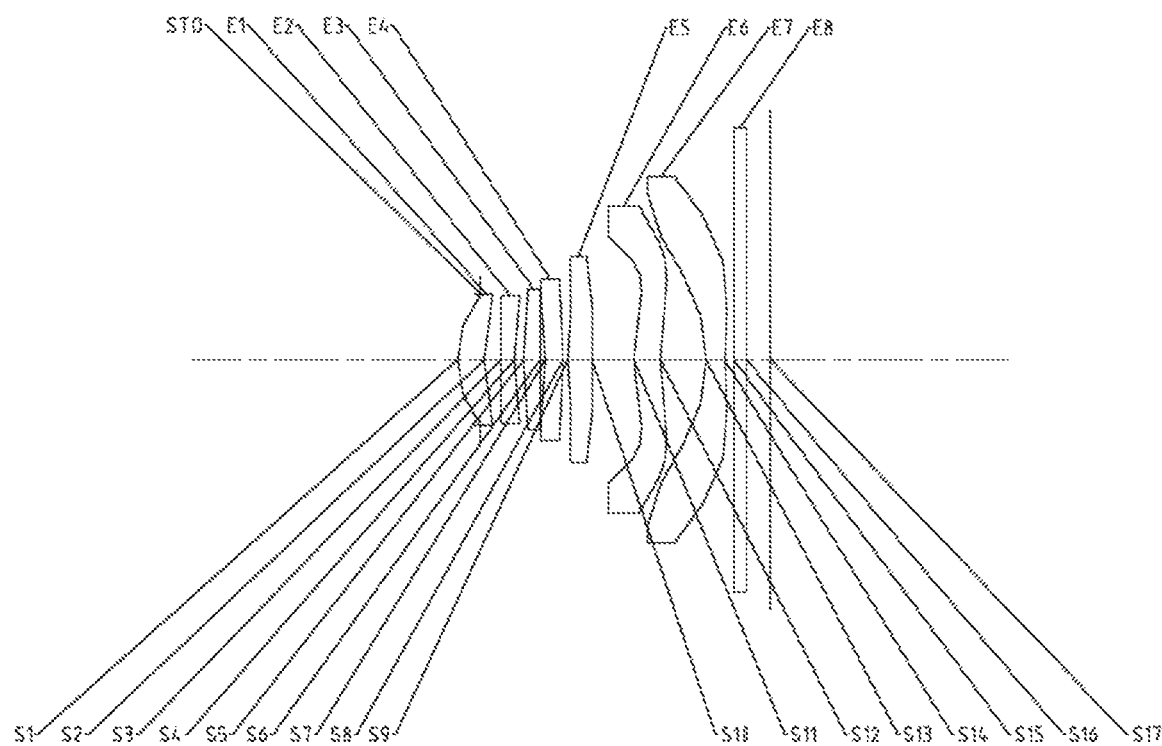
FIG. 11 illustrates a schematic structural view of an optical imaging lens assembly according to example 6 of the present disclosure.

An optical imaging lens assembly according to example 6 of the present disclosure is described below with reference to FIG. 11 to FIG. 12D. FIG. 11 shows a schematic structural

TABLE 9

Example 5: f = 4.79 mm, Fno = 1.95, HFOV = 44.4°, ImgH = 4.70 mm

| Surface number | Surface type | Radius of curvature | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.4468 | | | | |
| S1 | Aspheric | 1.9374 | 0.5656 | 1.55 | 56.11 | 6.51 | 0.3069 |
| S2 | Aspheric | 3.8178 | 0.2911 | | | | 1.4562 |
| S3 | Aspheric | 6.1453 | 0.2778 | 1.67 | 20.37 | −35.11 | 3.6552 |
| S4 | Aspheric | 4.7946 | 0.1505 | | | | 8.3208 |
| S5 | Aspheric | 12.4492 | 0.3898 | 1.55 | 56.11 | 22.30 | 42.1475 |
| S6 | Aspheric | −548.2469 | 0.1325 | | | | 80.0000 |
| S7 | Aspheric | −15.8505 | 0.2899 | 1.68 | 19.25 | 41.14 | 39.0351 |
| S8 | Aspheric | −10.1178 | 0.1251 | | | | −77.3909 |
| S9 | Aspheric | 10.5589 | 0.3503 | 1.61 | 28.31 | 55.00 | −22.4372 |
| S10 | Aspheric | 15.2498 | 0.5592 | | | | 56.6788 |
| S11 | Aspheric | 3.5488 | 0.5000 | 1.67 | 20.37 | 9.54 | −0.5173 |
| S12 | Aspheric | 7.5823 | 0.8817 | | | | 5.0046 |
| S13 | Aspheric | −3.7439 | 0.3500 | 1.62 | 25.92 | −3.72 | −0.1571 |
| S14 | Aspheric | 5.9045 | 0.1598 | | | | −77.6140 |
| S15 | Aspheric | Infinite | 0.2390 | 1.52 | 64.20 | | |
| S16 | Aspheric | Infinite | 0.4378 | | | | |
| S17 | Aspheric | Infinite | Infinite | | | | |

TABLE 10

| Surface number | A4 | A6 | A8 | A10 | A12 | A14 | A16 | A18 | A20 |
|---|---|---|---|---|---|---|---|---|---|
| S1 | −1.2012E−02 | 4.9912E−02 | −1.8005E−01 | 3.6625E−01 | −4.3771E−01 | 3.0536E−01 | −1.1475E−01 | 1.8029E−02 | 1.4586E−05 |
| S2 | −7.5971E−03 | −9.0035E−02 | 4.1786E−01 | −1.1531E+00 | 1.9514E+00 | −2.0407E+00 | 1.2890E+00 | 4.5028E−01 | 6.6819E−02 |
| S3 | −6.7389E−02 | −1.5797E−02 | 6.2454E−02 | −2.2484E−01 | 5.1337E−01 | −6.3782E−01 | 4.4814E−01 | −1.6941E−01 | 2.6671E−02 |
| S4 | −4.5204E−02 | −3.9941E−02 | 1.3503E−01 | −3.4637E−01 | 6.0052E−01 | −6.0429E−01 | 3.5422E−01 | −1.1399E−01 | 1.5495E−02 |
| S5 | 2.9441E−03 | 1.9107E−02 | −1.1025E−01 | 2.6282E−01 | −4.0721E−01 | 4.0857E−01 | −2.4664E−01 | 8.1863E−02 | −1.1472E−02 |
| S6 | −4.2475E−02 | −6.7218E−03 | 1.9866E−02 | 7.1734E−03 | −3.9361E−02 | 2.9812E−02 | −2.8086E−03 | −5.5137E−03 | 1.9602E−03 |
| S7 | −5.8945E−02 | −2.5185E−02 | −2.3433E−02 | 2.1933E−01 | −3.5960E−01 | 3.1708E−01 | −1.6483E−01 | 4.7249E−02 | −5.7785E−03 |
| S8 | −4.7425E−02 | 2.6956E−02 | −1.2618E−01 | 2.6713E−01 | −3.9300E−01 | 1.9347E−01 | −7.6821E−02 | 1.6906E−02 | −1.5943E−03 |
| S9 | −4.0900E−02 | 7.5937E−02 | −1.2013E−01 | 1.3318E−01 | −1.0422E−01 | 5.3476E−02 | −1.7008E−02 | 3.0401E−03 | −2.3231E−04 |
| S10 | −6.6235E−02 | 6.9186E−02 | −6.4061E−02 | 5.1450E−02 | −3.2456E−02 | 1.3741E−02 | −3.5711E−03 | 5.1389E−04 | −3.1343E−05 |
| S11 | −2.4536E−02 | 8.3653E−04 | −1.1507E−02 | 7.0366E−03 | −3.4415E−03 | 1.4307E−03 | −3.9772E−04 | 6.0362E−05 | −3.6926E−06 |
| S12 | 2.6312E−02 | −8.4589E−03 | −1.2367E−02 | 8.4804E−03 | −2.6882E−03 | 5.0150E−04 | −5.6315E−05 | 3.5410E−06 | −9.6203E−08 |
| S13 | −4.1176E−02 | 1.7394E−02 | −5.1908E−03 | 1.4285E−03 | −2.9223E−04 | 3.9611E−05 | 3.3117E−06 | 1.5388E−07 | −3.0442E−09 |
| S14 | −2.7061E−02 | 2.9021E−03 | 3.0218E−04 | −4.1879E−04 | 1.3581E−04 | −2.1960E−05 | 1.9241E−06 | −8.7348E−08 | 1.6144E−09 |

Figure 10A:
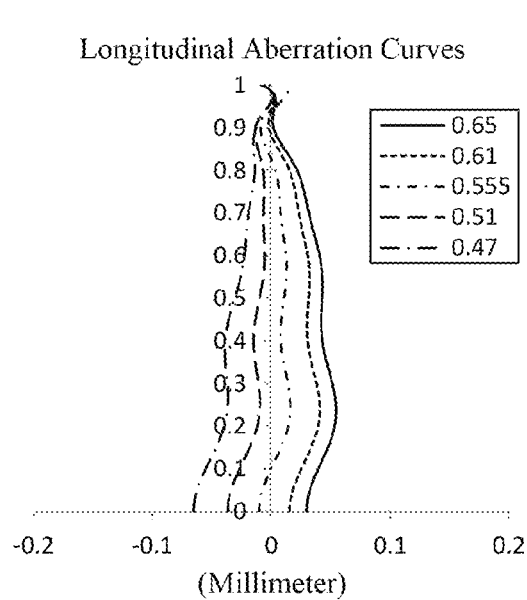
FIGS. 10A to 10D illustrate longitudinal aberration curves, astigmatic curves, a distortion curve, and a lateral color curve of the optical imaging lens assembly of the example 5, respectively.
Figure 10B:
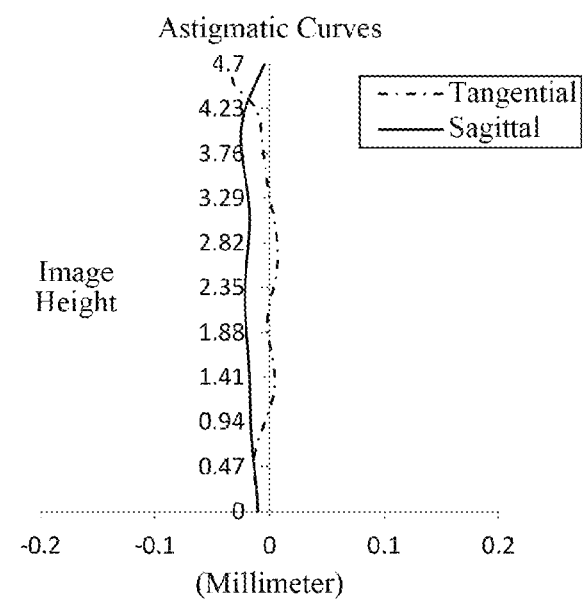
Figure 10C:
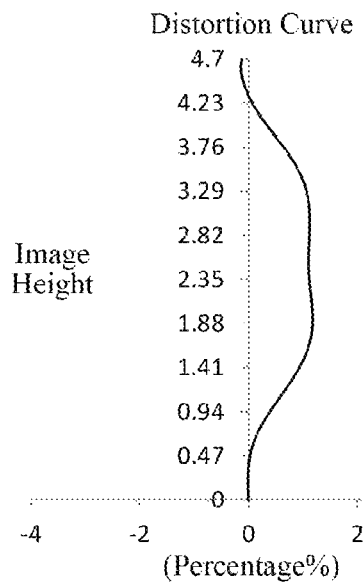
Figure 10D:
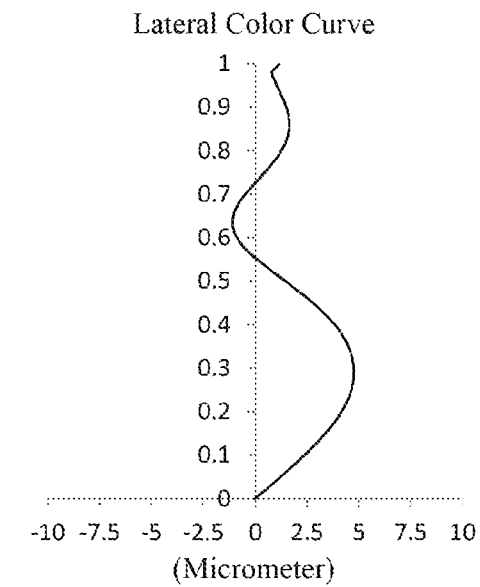

FIG. 10A illustrates longitudinal aberration curves of the optical imaging lens assembly according to example 5, representing the deviations of focal points converged by light of different wavelengths after passing through the lens assembly. FIG. 10B illustrates astigmatic curves of the optical imaging lens assembly according to example 5, representing the curvatures of a tangential plane and the curvatures of a sagittal plane. FIG. 10C illustrates a distortion curve of the optical imaging lens assembly according to example 5, representing the amounts of distortion corresponding to different image heights. FIG. 10D illustrates a lateral color curve of the optical imaging lens assembly according to example 5, representing the deviations of different image heights on an imaging plane after light view of the optical imaging lens assembly according to example 6 of the present disclosure.

As shown in FIG. 11, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is convex. The fifth lens E5 has positive refractive power, an object-side surface S9 thereof is convex, and an image-side surface S10 thereof is concave. The sixth lens E6 has positive refractive power, an object-side surface S11 thereof is convex, and an image-side surface S12 thereof is concave. The seventh lens E7 has negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

Table 11 is a table illustrating basic parameters of the optical imaging lens assembly of example 6, wherein the units for the radius of curvature, the thickness and the focal length are millimeter (mm). Table 12 shows high-order coefficients applicable to each aspheric surface in example 6, wherein the surface shape of each aspheric surface may be defined by the formula (1) given in the above example 1.

Figure 12A:
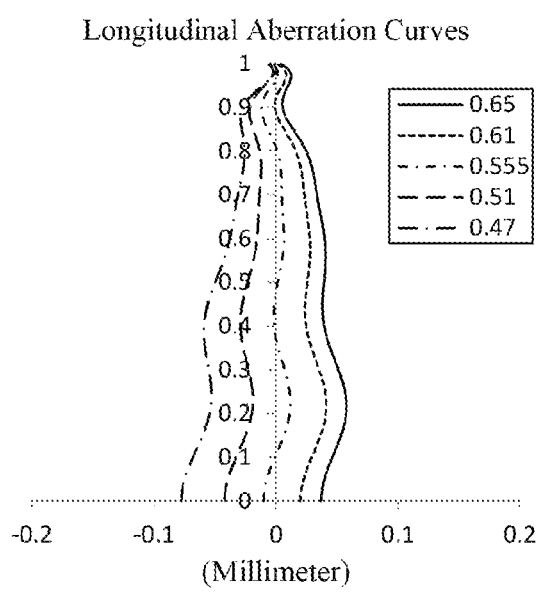
FIGS. 12A to 12D illustrate longitudinal aberration curves, astigmatic curves, a distortion curve, and a lateral color curve of the optical imaging lens assembly of the example 6, respectively.
Figure 12B:
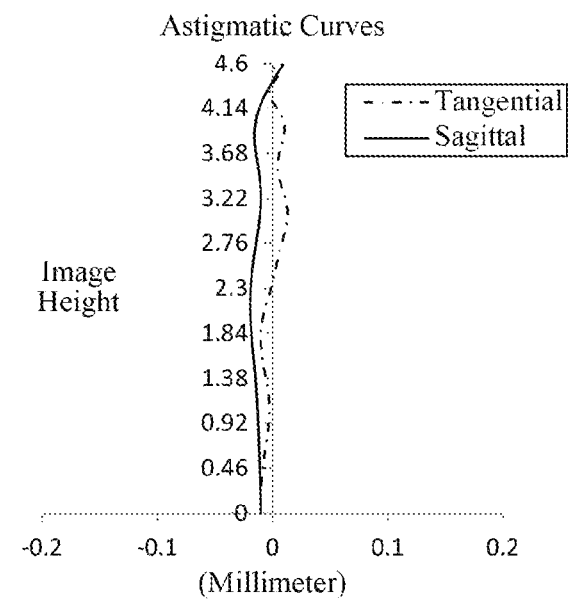
Figure 12C:
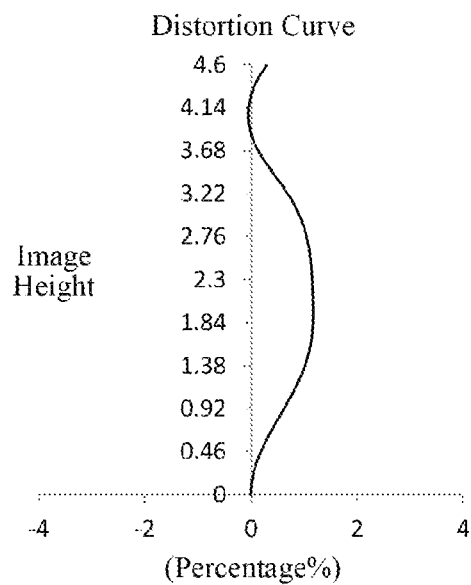
Figure 12D:
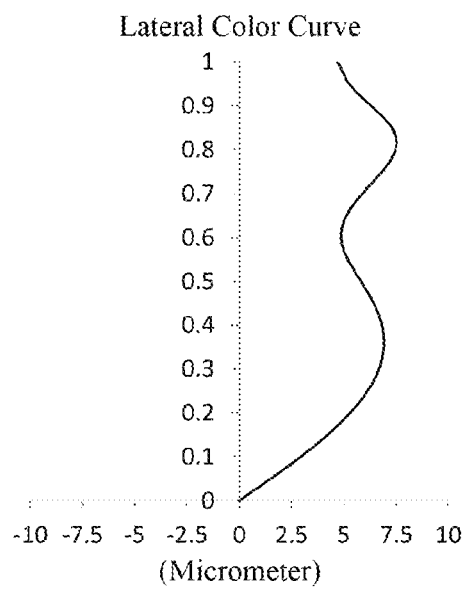

FIG. 12A illustrates longitudinal aberration curves of the optical imaging lens assembly according to example 6, representing the deviations of focal points converged by light of different wavelengths after passing through the lens assembly. FIG. 12B illustrates astigmatic curves of the optical imaging lens assembly according to example 6, representing the curvatures of a tangential plane and the curvatures of a sagittal plane. FIG. 12C illustrates a distortion curve of the optical imaging lens assembly according to example 6, representing the amounts of distortion corresponding to different image heights. FIG. 12D illustrates a lateral color curve of the optical imaging lens assembly according to example 6, representing the deviations of different image heights on an imaging plane after light passes through the lens assembly. It can be seen from FIG. 12A to FIG. 12D that the optical imaging lens assembly provided in example 6 may achieve good image quality.

Example 7

An optical imaging lens assembly according to example 7 of the present disclosure is described below with reference

TABLE 11

Example 6: f = 4.83 mm, Fno = 2.00, HFOV = 43.4°, ImgH = 4.60 mm

| Surface number | Surface type | Radius of curvature | Thickness | Refractive index | Abbe number | Focal length | Conic coefficient |
|---|---|---|---|---|---|---|---|
| OBJ | Spherical | Infinite | Infinite | | | | |
| STO | Spherical | Infinite | −0.4186 | | | | |
| S1 | Aspheric | 1.9757 | 0.4918 | 1.55 | 56.11 | 6.36 | 0.3078 |
| S2 | Aspheric | 4.1809 | 0.3101 | | | | 1.4407 |
| S3 | Aspheric | 6.1249 | 0.2500 | 1.67 | 20.37 | −39.76 | 6.3020 |
| S4 | Aspheric | 4.9081 | 0.1699 | | | | 8.1401 |
| S5 | Aspheric | 20.7513 | 0.3022 | 1.55 | 56.11 | −33.52 | 39.5443 |
| S6 | Aspheric | 9.6746 | 0.1000 | | | | −80.0000 |
| S7 | Aspheric | 33.1129 | 0.3270 | 1.68 | 19.25 | 41.10 | −69.0462 |
| S8 | Aspheric | −157.7775 | 0.0861 | | | | −80.0000 |
| S9 | Aspheric | 5.2232 | 0.4490 | 1.61 | 28.31 | 11.23 | −34.0450 |
| S10 | Aspheric | 21.6187 | 0.7719 | | | | 64.2405 |
| S11 | Aspheric | 3.6318 | 0.4862 | 1.67 | 20.37 | 10.01 | −1.0106 |
| S12 | Aspheric | 7.5405 | 0.8450 | | | | 4.5524 |
| S13 | Aspheric | −3.7711 | 0.3500 | 1.62 | 25.92 | −3.77 | −0.1775 |
| S14 | Aspheric | 6.0252 | 0.1690 | | | | −34.5893 |
| S15 | Aspheric | Infinite | 0.2251 | 1.52 | 64.20 | | |
| S16 | Aspheric | Infinite | 0.4469 | | | | |
| S17 | Aspheric | Infinite | Infinite | | | | |

TABLE 12

Figure 13:
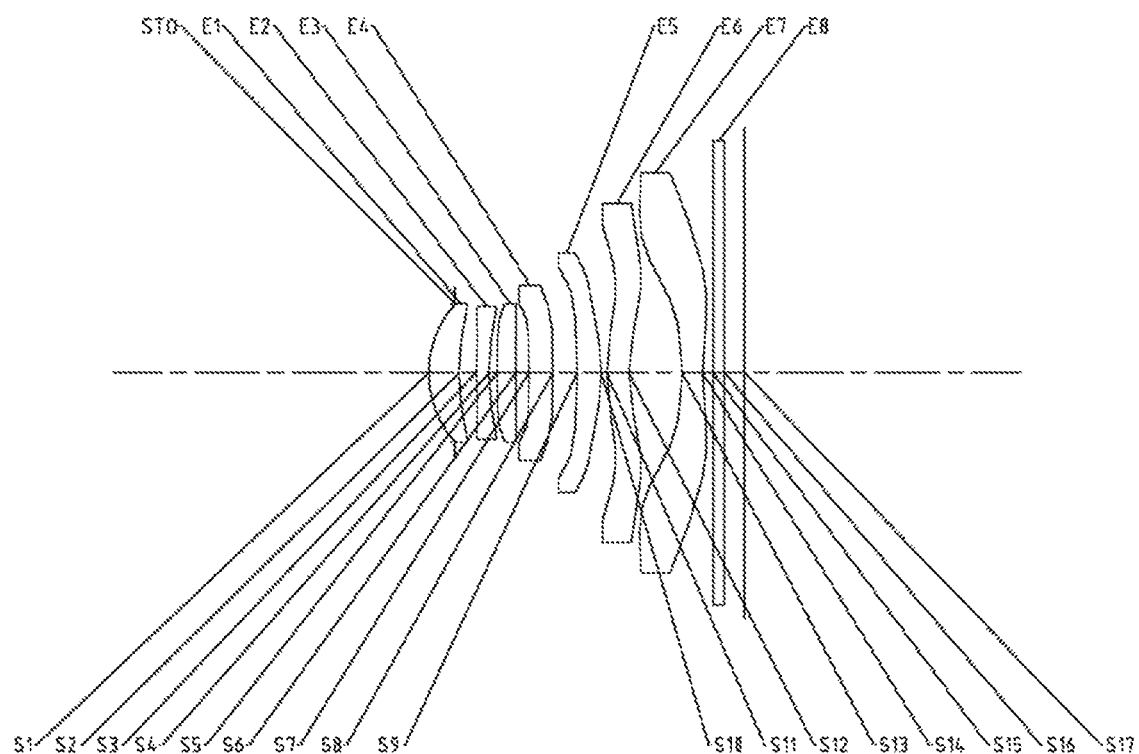
FIG. 13 illustrates a schematic structural view of an optical imaging lens assembly according to example 7 of the present disclosure.
Figure 14A:
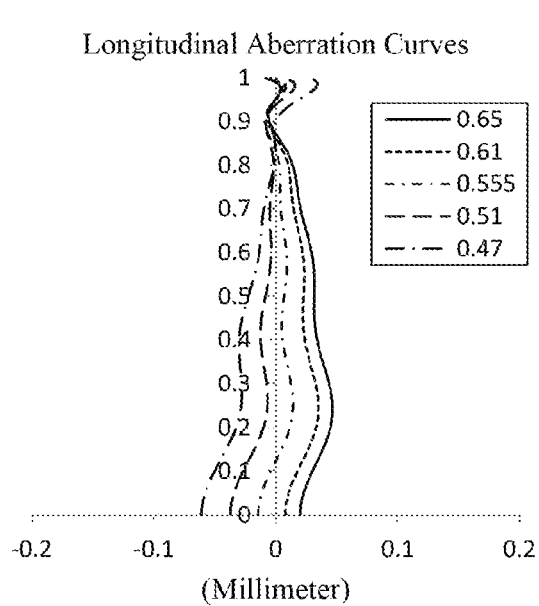
FIGS. 14A to 14D illustrate longitudinal aberration curves, astigmatic curves, a distortion curve, and a lateral color curve of the optical imaging lens assembly of the example 7, respectively.
Figure 14B:
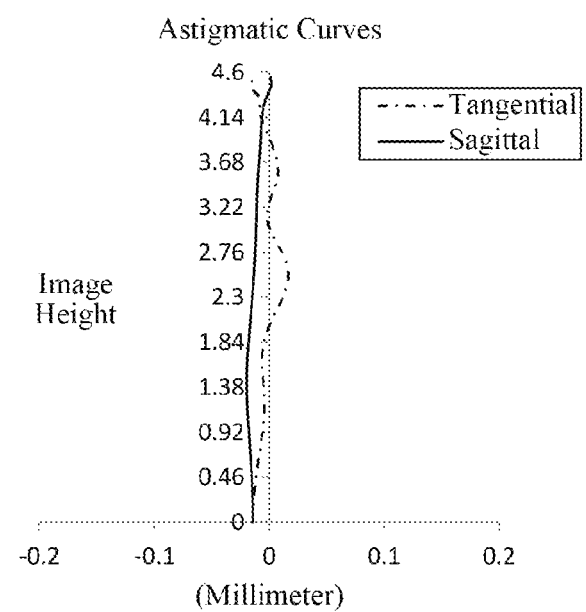
Figure 14C:
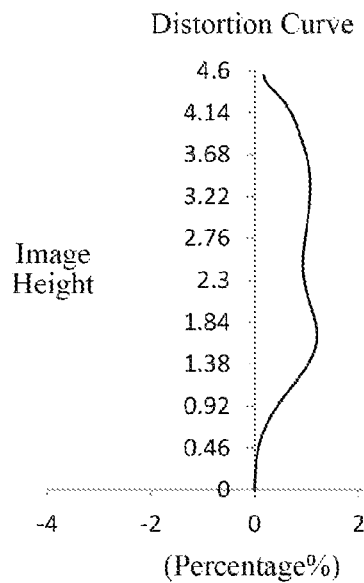
Figure 14D:
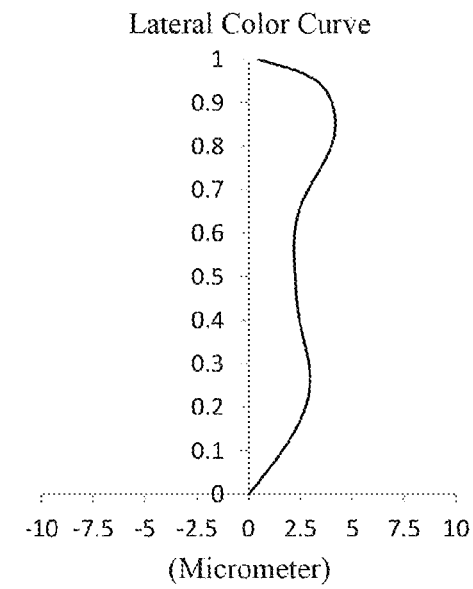

| Surface number | A4 | A6 | A8 | A10 | A12 | A14 | A16 | A18 | A20 |
|---|---|---|---|---|---|---|---|---|---|
| S1 | −1.2072E−02 | 5.1783E−02 | −1.9401E−01 | 4.1289E−01 | −5.2285E−01 | 3.9347E−01 | −1.6429E−01 | 3.1330E−02 | −1.0429E−03 |
| S2 | −1.3377E−02 | −6.7076E−02 | 3.1562E−01 | −8.8748E−01 | 1.5319E+00 | −1.6236E+00 | 1.0358E+00 | −3.6513E−01 | 5.4909E−02 |
| S3 | −7.7424E−02 | 5.0326E−03 | −7.4194E−02 | 2.1316E−01 | −2.8236E−01 | 2.5680E−01 | −1.6180E−01 | 5.9894E−02 | −9.6832E−03 |
| S4 | −4.5536E−02 | −5.8935E−02 | 1.9213E−01 | −4.6466E−01 | 7.5146E−01 | −7.0004E−01 | 3.7051E−01 | −1.0438E−01 | 1.1947E−02 |
| S5 | 4.2183E−03 | 2.6869E−02 | −1.2481E−01 | 2.9701E−01 | −4.9753E−01 | 5.3672E−01 | −3.4032E−01 | 1.1676E−01 | −1.6796E−02 |
| S6 | −5.9552E−02 | 1.6165E−02 | −8.3424E−02 | 4.9366E−02 | −8.3357E−02 | 5.7546E−02 | −1.2974E−02 | −3.4329E−03 | 1.8097E−03 |
| S7 | −6.3398E−02 | −3.6572E−02 | −2.9332E−02 | 3.1204E−01 | −5.3177E−01 | 4.8434E−01 | −2.6187E−01 | 7.8695E−02 | −1.0115E−02 |
| S8 | −5.4375E−02 | 2.1603E−02 | −9.0704E−02 | 2.2422E−01 | −2.6516E−01 | 1.8372E−01 | −7.5854E−02 | 1.7282E−02 | −1.6811E−03 |
| S9 | −4.2543E−02 | 7.3184E−02 | −1.0628E−01 | 1.1749E−01 | −9.4207E−02 | 4.9599E−02 | −1.6106E−02 | 2.9253E−03 | −2.2656E−04 |
| S10 | −5.4781E−02 | 6.1263E−02 | −5.9615E−02 | 4.9300E−02 | −3.1253E−02 | 1.3207E−02 | −3.4319E−03 | 4.9523E−04 | −3.0325E−05 |
| S11 | −2.4469E−02 | 4.5249E−03 | −1.0217E−02 | 3.9906E−03 | −8.5009E−04 | 1.9617E−04 | −6.2926E−05 | 1.2166E−05 | −8.5831E−07 |
| S12 | 1.5761E−02 | −3.8616E−03 | −1.0672E−02 | 6.4433E−03 | −1.8751E−03 | 3.2428E−04 | −3.3942E−05 | 1.9995E−06 | −5.1211E−08 |
| S13 | −4.0618E−02 | 1.8999E−02 | −6.8139E−03 | 2.3248E−03 | −5.7105E−04 | 9.0414E−05 | −8.7087E−06 | 4.6389E−07 | −1.0493E−08 |
| S14 | −3.6950E−02 | 1.0175E−02 | −2.7906E−03 | 5.5059E−04 | −6.6515E−05 | 4.0421E−06 | −4.3017E−08 | −6.5861E−09 | 2.1657E−10 | to FIG. 13 to FIG. 14D. FIG. 13 shows a schematic structural view of the optical imaging lens assembly according to example 7 of the present disclosure.

As shown in FIG. 13, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has positive refractive power, an object-side surface S7 thereof is convex, and an image-side surface S8 thereof is concave. The fifth lens E5 has positive refractive power, an object-side surface S9 thereof is concave, and an image-side surface S10 thereof is convex. The sixth lens E6 has negative refractive power, an object-side surface S11 thereof is convex, and an image-side surface S12 thereof is concave. The seventh lens E7 has negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

Table 13 is a table illustrating basic parameters of the optical imaging lens assembly of example 7, wherein the units for the radius of curvature, the thickness and the focal length are millimeter (mm). Table 14 shows high-order coefficients applicable to each aspheric surface in example 7, wherein the surface shape of each aspheric surface may be defined by the formula (1) given in the above example 1.

TABLE 13

Example 7: f = 4.84 mm, Fno = 1.89, HFOV = 43.1°, ImgH = 4.55 mm

| Surface number | Surface type | Radius of curvature | Thickness | Refractive index | Abbe number | Focal length | Conic coefficient |
|---|---|---|---|---|---|---|---|
| OBJ | Spherical | Infinite | Infinite | | | | |
| STO | Spherical | Infinite | −0.4790 | | | | |
| S1 | Aspheric | 1.9453 | 0.5648 | 1.55 | 56.11 | 6.05 | 0.2353 |
| S2 | Aspheric | 4.2509 | 0.3134 | | | | 0.3117 |
| S3 | Aspheric | 4.8909 | 0.2400 | 1.67 | 20.37 | −32.34 | 5.6245 |
| S4 | Aspheric | 3.9082 | 0.1466 | | | | 6.2257 |
| S5 | Aspheric | 40.5105 | 0.3481 | 1.55 | 56.11 | 32.31 | 72.6170 |
| S6 | Aspheric | −31.1573 | 0.2432 | | | | 80.0000 |
| S7 | Aspheric | 18.9060 | 0.4443 | 1.68 | 19.25 | 666.00 | −80.0000 |
| S8 | Aspheric | 19.5948 | 0.4486 | | | | −80.0000 |
| S9 | Aspheric | −12.0569 | 0.4500 | 1.61 | 28.31 | 7.31 | 32.7276 |
| S10 | Aspheric | −3.2899 | 0.1000 | | | | −6.5301 |
| S11 | Aspheric | 3.7224 | 0.4107 | 1.67 | 20.37 | −67.63 | 0.5491 |
| S12 | Aspheric | 3.2867 | 0.9894 | | | | −1.5127 |
| S13 | Aspheric | −4.9568 | 0.3798 | 1.62 | 25.92 | −4.44 | −0.2128 |
| S14 | Aspheric | 6.0704 | 0.1911 | | | | −7.3156 |
| S15 | Aspheric | Infinite | 0.2100 | 1.52 | 64.20 | | |
| S16 | Aspheric | Infinite | 0.3700 | | | | |
| S17 | Aspheric | Infinite | Infinite | | | | |

TABLE 14

| Surface number | A4 | A6 | A8 | A10 | A12 | A14 | A16 | A18 | A20 |
|---|---|---|---|---|---|---|---|---|---|
| S1 | −9.3729E−03 | 2.7810E−02 | −8.4339E−02 | 1.3604E−01 | −1.2044E−01 | 5.0103E−02 | 1.1294E−04 | −7.2832E−03 | 1.7870E−03 |
| S2 | −1.5521E−02 | −4.7637E−02 | 1.8647E−01 | −4.3552E−01 | 6.2633E−01 | −5.5078E−01 | 2.8871E−01 | −8.2438E−02 | 9.8371E−03 |
| S3 | −8.9905E−02 | 1.9170E−02 | −1.5090E−01 | 4.2462E−01 | −6.1290E−01 | 5.6408E−01 | −3.3306E−01 | 1.1361E−01 | −1.6960E−02 |
| S4 | −4.8762E−02 | −3.8302E−02 | 1.0766E−01 | −2.8954E−01 | 5.5455E−01 | −6.0881E−01 | 3.7961E−01 | −1.2644E−01 | 1.7269E−02 |
| S5 | 3.5598E−02 | 3.6573E−02 | −1.3697E−01 | 2.6977E−01 | −3.7991E−01 | 3.6176E−01 | −2.1367E−01 | 7.2095E−02 | −1.0694E−02 |
| S6 | −2.8794E−02 | 7.4709E−02 | −1.4524E−01 | 2.4545E−01 | −2.8359E−01 | −1.5499E−01 | 4.8360E−01 | −6.2185E−03 | |
| S7 | −9.6145E−02 | 7.0495E−02 | −2.1547E−01 | 5.5206E−01 | −8.7355E−01 | 8.3746E−01 | −4.8101E−01 | 1.5246E−01 | −2.0505E−02 |
| S8 | −6.0118E−02 | −3.7215E−02 | 1.1292E−01 | −1.6058E−01 | 1.4596E−01 | −8.5589E−02 | 3.1124E−02 | −6.2953E−03 | 5.3390E−04 |
| S9 | 2.5178E−02 | −3.8244E−02 | 5.5954E−02 | −5.6662E−02 | 3.4974E−02 | −1.3505E−02 | 3.1702E−03 | −4.1132E−04 | 2.2615E−05 |
| S10 | 1.6782E−02 | −4.8524E−03 | 1.2993E−02 | −1.3079E−02 | 6.4849E−03 | −1.9306E−03 | 3.5252E−04 | −3.6485E−05 | 1.6401E−06 |
| S11 | −1.4546E−02 | −2.0648E−02 | 1.0008E−02 | −2.5989E−03 | 3.6867E−04 | −1.2848E−05 | −3.9857E−06 | 5.7053E−07 | −2.3774E−08 |
| S12 | 3.2902E−04 | −2.9014E−02 | 1.4984E−02 | −4.5673E−03 | 9.0781E−04 | −1.1558E−04 | 9.0294E−06 | −3.9385E−07 | 7.3483E−09 |
| S13 | 7.1021E−03 | −2.2151E−02 | 8.3170E−03 | −1.2203E−03 | 5.8204E−05 | 5.4295E−06 | −9.0880E−07 | 4.8456E−08 | −9.4583E−10 |
| S14 | −1.6324E−02 | −4.8598E−03 | 1.5722E−03 | −1.5265E−04 | 5.5032E−06 | −3.9530E−07 | 7.7808E−08 | −5.6411E−09 | 1.3402E−10 |

FIG. 14A illustrates longitudinal aberration curves of the optical imaging lens assembly according to example 7, representing the deviations of focal points converged by light of different wavelengths after passing through the lens assembly. FIG. 14B illustrates astigmatic curves of the optical imaging lens assembly according to example 7, representing the curvatures of a tangential plane and the curvatures of a sagittal plane. FIG. 14C illustrates a distortion curve of the optical imaging lens assembly according to example 7, representing the amounts of distortion corresponding to different image heights. FIG. 14D illustrates a lateral color curve of the optical imaging lens assembly according to example 7, representing the deviations of different image heights on an imaging plane after light passes through the lens assembly. It can be seen from FIG. 14A to FIG. 14D that the optical imaging lens assembly provided in example 7 may achieve good image quality.

Example 8

Figure 15:
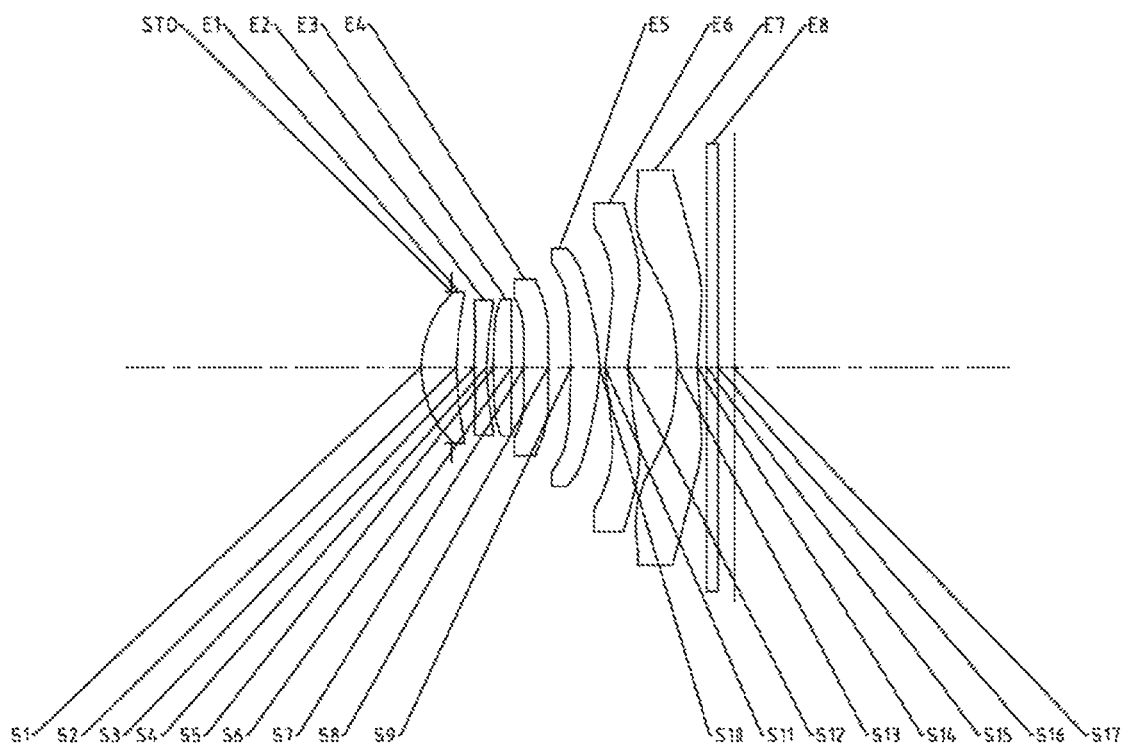
FIG. 15 illustrates a schematic structural view of an optical imaging lens assembly according to example 8 of the present disclosure.

An optical imaging lens assembly according to example 8 of the present disclosure is described below with reference to FIG. 15 to FIG. 16D. FIG. 15 shows a schematic structural view of the optical imaging lens assembly according to example 8 of the present disclosure.

As shown in FIG. 15, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has positive refractive power, an object-side surface S7 thereof is convex, and an image-side surface S8 thereof is concave. The fifth lens E5 has positive refractive power, an object-side surface S9 thereof is concave, and an image-side surface S10 thereof is convex. The sixth lens E6 has negative refractive power, an object-side surface S11 thereof is convex, and an image-side surface S12 thereof is concave. The seventh lens E7 has negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

Table 15 is a table illustrating basic parameters of the optical imaging lens assembly of example 8, wherein the units for the radius of curvature, the thickness and the focal length are millimeter (mm). Table 16 shows high-order coefficients applicable to each aspheric surface in example 8, wherein the surface shape of each aspheric surface may be defined by the formula (1) given in the above example 1.

TABLE 15

Example 8: f = 4.72 mm, Fno = 1.66, HFOV = 42.6°, ImgH = 4.40 mm

| Surface number | Surface type | Radius of curvature | Thickness | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.5699 | | | | |
| S1 | Aspheric | 2.0015 | 0.6573 | 1.55 | 56.11 | 5.82 | 0.2107 |
| S2 | Aspheric | 4.7787 | 0.3326 | | | | 0.0982 |
| S3 | Aspheric | 5.2561 | 0.2300 | 1.67 | 20.37 | −23.50 | 6.7366 |
| S4 | Aspheric | 3.8663 | 0.1329 | | | | 6.0735 |
| S5 | Aspheric | 34.9773 | 0.3446 | 1.55 | 56.11 | 26.71 | −73.0641 |
| S6 | Aspheric | −24.9282 | 0.2303 | | | | 80.0000 |
| S7 | Aspheric | 12.4312 | 0.4497 | 1.68 | 19.25 | 664.16 | −73.5020 |
| S8 | Aspheric | 12.6214 | 0.4277 | | | | −63.0221 |
| S9 | Aspheric | −11.5291 | 0.5400 | 1.61 | 28.31 | 6.76 | 30.7338 |
| S10 | Aspheric | −3.0796 | 0.1001 | | | | −4.5924 |
| S11 | Aspheric | 3.7758 | 0.4241 | 1.67 | 20.37 | −49.57 | 0.5044 |
| S12 | Aspheric | 3.2363 | 0.9254 | | | | −1.7073 |
| S13 | Aspheric | −4.9209 | 0.3797 | 1.62 | 25.92 | −4.35 | −0.3652 |
| S14 | Aspheric | 5.8766 | 0.1741 | | | | −6.6864 |
| S15 | Aspheric | Infinite | 0.2100 | 1.52 | 64.20 | | |
| S16 | Aspheric | Infinite | 0.3077 | | | | |
| S17 | Aspheric | Infinite | Infinite | | | | |

TABLE 16

| Surface number | A4 | A6 | A8 | A10 | A12 | A14 | A16 | A18 | A20 |
|---|---|---|---|---|---|---|---|---|---|
| S1 | −8.7186E−03 | 2.6266E−02 | −7.7347E−02 | 1.2868E−01 | −1.3249E−01 | 8.5222E−02 | −3.3390E−02 | 7.2939E−03 | −6.7968E−04 |
| S2 | −1.2614E−02 | −3.3183E−02 | 1.1812E−01 | −2.4872E−01 | 3.2015E−01 | −2.5144E−01 | 1.1767E−01 | −3.0072E−02 | 3.2203E−03 |
| S3 | −8.8083E−02 | 2.0561E−02 | −1.3362E−01 | 3.5995E−01 | −4.8236E−01 | 4.0012E−01 | −2.0891E−01 | 6.2338E−02 | −8.0638E−03 |
| S4 | −4.9013E−02 | −3.7356E−02 | 9.5772E−02 | −2.4499E−01 | 4.5353E−01 | 4.8601E−01 | 2.9846E−01 | −9.8877E−02 | 1.3627E−02 |
| S5 | 3.7307E−02 | 4.4228E−02 | −1.5660E−01 | 2.4820E−01 | −2.5884E−01 | 1.8095E−01 | −7.9185E−02 | 2.0508E−02 | −2.4969E−03 |
| S6 | −3.0030E−02 | 6.9191E−02 | −1.0387E−01 | 1.0909E−01 | −7.9140E−02 | 2.9284E−02 | 1.1559E−03 | −4.4664E−03 | 1.2899E−03 |
| S7 | −9.6964E−02 | 7.4912E−02 | −2.2140E−01 | 5.1128E−01 | −7.6414E−01 | 7.0908E−01 | −3.9826E−01 | 1.2406E−01 | −1.6435E−02 |
| S8 | −5.4574E−02 | −3.0356E−02 | 8.7012E−02 | −1.2686E−01 | 1.1470E−01 | −6.5407E−02 | 2.2795E−02 | −4.3639E−03 | 3.4630E−04 |

TABLE 16-continued

| Surface number | A4 | A6 | A8 | A10 | A12 | A14 | A16 | A18 | A20 |
|---|---|---|---|---|---|---|---|---|---|
| S9 | 2.4820E−02 | −3.3900E−02 | 4.9622E−02 | −5.0820E−02 | 3.1123E−02 | −1.1770E−02 | 2.6824E−03 | −3.3562E−04 | 1.7708E−05 |
| S10 | 1.3320E−02 | −5.7867E−03 | 1.2860E−02 | −1.1640E−02 | 5.5447E−03 | −1.6276E−03 | 2.9489E−04 | −3.0203E−05 | 1.3336E−06 |
| S11 | −1.7155E−02 | −2.0596E−02 | 1.0015E−02 | −2.5986E−03 | 3.6867E−04 | −1.2850E−05 | −3.9862E−06 | 5.7043E−07 | −2.3790E−08 |
| S12 | 3.2142E−04 | −2.9566E−02 | 1.5326E−02 | −4.7264E−03 | 9.5084E−04 | −1.2264E−04 | 9.7422E−06 | −4.3512E−07 | 8.3962E−09 |
| S13 | 7.3195E−03 | −2.0852E−02 | 7.6805E−03 | −1.1073E−03 | 5.2382E−05 | 4.5967E−06 | −7.6143E−07 | 3.9728E−08 | −7.5678E−10 |
| S14 | −2.0242E−02 | 3.4893E−04 | −1.0865E−03 | 5.8026E−04 | −1.1471E−04 | 1.1663E−05 | −6.4826E−07 | 1.8510E−08 | −2.0788E−10 |

Figure 16A:
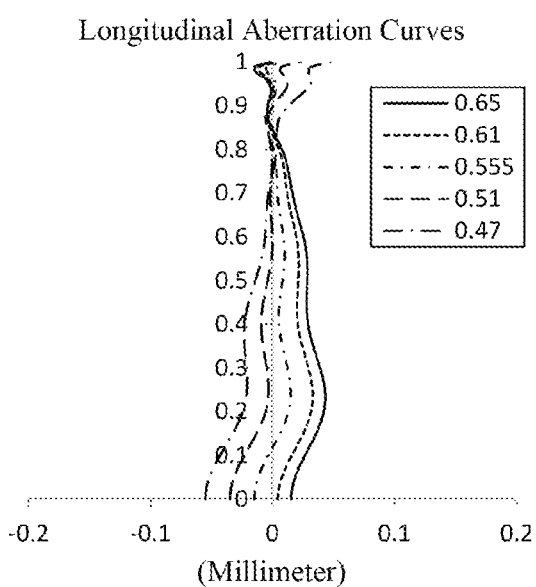
FIGS. 16A to 16D illustrate longitudinal aberration curves, astigmatic curves, a distortion curve, and a lateral color curve of the optical imaging lens assembly of the example 8, respectively.
Figure 16B:
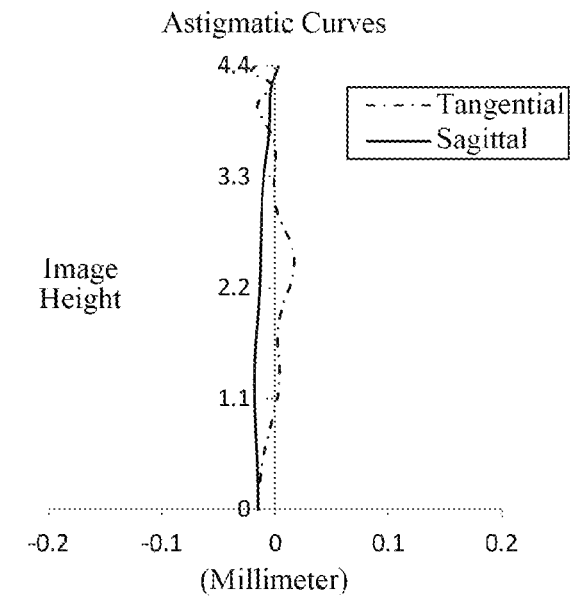
Figure 16C:
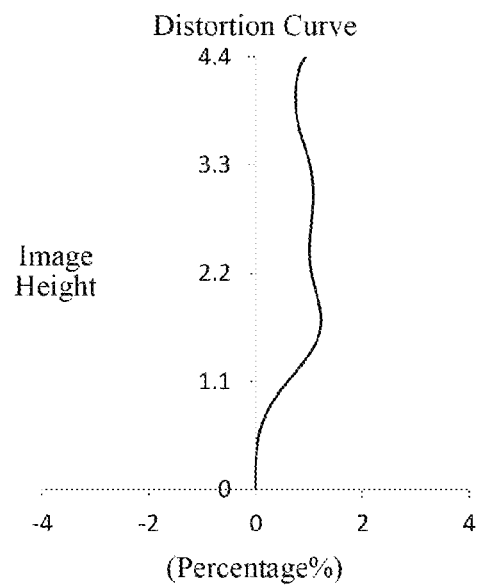
Figure 16D:
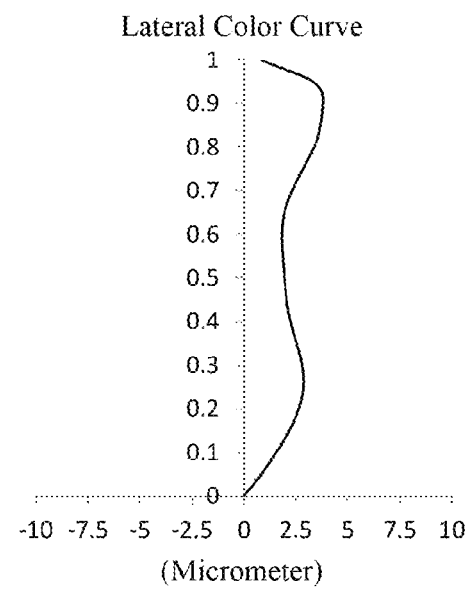

FIG. 16A illustrates longitudinal aberration curves of the optical imaging lens assembly according to example 8, representing the deviations of focal points converged by light of different wavelengths after passing through the lens assembly. FIG. 16B illustrates astigmatic curves of the optical imaging lens assembly according to example 8, representing the curvatures of a tangential plane and the curvatures of a sagittal plane. FIG. 16C illustrates a distortion curve of the optical imaging lens assembly according to example 8, representing the amounts of distortion corresponding to different image heights. FIG. 16D illustrates a lateral color curve of the optical imaging lens assembly according to example 8, representing the deviations of different image heights on an imaging plane after light passes through the lens assembly. It can be seen from FIG. 16A to FIG. 16D that the optical imaging lens assembly provided in example 8 may achieve good image quality.

In view of the above, examples 1 to 8 respectively satisfy the relationship shown in Table 17.

TABLE 17

| Conditional/Example | 1 | 2 | 3 | 4 | 5 | 6 | 7 | 8 |
|---|---|---|---|---|---|---|---|---|
| tan(HFOV)*f (mm) | 4.93 | 4.53 | 4.46 | 4.62 | 4.69 | 4.57 | 4.52 | 4.34 |
| TTL/f1 | 0.94 | 0.87 | 0.82 | 0.89 | 0.88 | 0.91 | 0.97 | 1.01 |
| TTL/ImgH | 1.24 | 1.29 | 1.33 | 1.25 | 1.21 | 1.26 | 1.29 | 1.33 |
| f/f5 | 0.47 | 0.79 | 0.92 | 0.44 | 0.09 | 0.43 | 0.66 | 0.70 |
| |f7/f| | 0.88 | 0.94 | 1.14 | 0.89 | 0.78 | 0.78 | 0.92 | 0.92 |
| R13/f | −0.77 | −1.10 | −0.69 | −0.88 | −0.78 | −0.78 | −1.02 | −1.04 |
| |R11 − R12|/|R11 + R12| | 0.08 | 0.03 | 0.06 | 0.12 | 0.36 | 0.35 | 0.06 | 0.08 |
| T67/(CT6 + CT7) | 1.33 | 1.10 | 1.15 | 1.07 | 1.04 | 1.01 | 1.25 | 1.15 |
| R1/R4 | 0.55 | 0.43 | 0.61 | 0.50 | 0.40 | 0.40 | 0.50 | 0.52 |
| T23/T12 | 0.28 | 0.34 | 0.28 | 0.46 | 0.52 | 0.55 | 0.47 | 0.40 |
| DT31/DT21 | 1.07 | 1.07 | 1.08 | 1.05 | 1.09 | 1.09 | 1.04 | 1.01 |

The present disclosure further provides an imaging apparatus having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
   a first lens having positive refractive power and a concave image-side surface;
   a second lens having refractive power and a concave image-side surface;
   a third lens having refractive power;
   a fourth lens having refractive power;
   a fifth lens having positive refractive power;
   a sixth lens having refractive power, a convex object-side surface and a concave image-side surface; and
   a seventh lens having refractive power and a concave object-side surface,
   wherein tan(HFOV)*f≥4.34 mm, $-1.3 < R13/f < -0.3$, and $0 < T23/T12 < 0.7$, where HFOV is half of a maximum field-of-view of the optical imaging lens assembly, f is a total effective focal length of the optical imaging lens assembly, R13 is a radius of curvature of the object-side surface of the seventh lens, T12 is a spaced interval between the first lens and the second lens along the optical axis, and T23 is a spaced interval between the second lens and the third lens along the optical axis.

2. The optical imaging lens assembly according to claim 1, wherein 0.6<TTL/f1<1.3,
   where TTL is a distance along the optical axis from an object-side surface of the first lens to an imaging plane of the optical imaging lens assembly, and f1 is an effective focal length of the first lens.

3. The optical imaging lens assembly according to claim 1,
   wherein f/EPD≤2,
   where EPD is an entrance pupil diameter of the optical imaging lens assembly.

4. The optical imaging lens assembly according to claim 1, wherein 0<f/f5<1, where f5 is an effective focal length of the fifth lens.

5. The optical imaging lens assembly according to claim 1, wherein $0.5<|f7/f|<1.3$,
where f7 is an effective focal length of the seventh lens.

6. The optical imaging lens assembly according to claim 1, wherein $0<|R11-R12|/|R11+R12|<0.5$,
where R11 is a radius of curvature of the object-side surface of the sixth lens, and R12 is a radius of curvature of the image-side surface of the sixth lens.

7. The optical imaging lens assembly according to claim 1, wherein $0.8<T67/(CT6+CT7)<1.5$,
where CT6 is a center thickness of the sixth lens along the optical axis, CT7 is a center thickness of the seventh lens along the optical axis, and T67 is a spaced interval between the sixth lens and the seventh lens along the optical axis.

8. The optical imaging lens assembly according to claim 1, wherein $0.2<R1/R4<0.7$,
where R1 is a radius of curvature of an object-side surface of the first lens, and R4 is a radius of curvature of an image-side surface of the second lens.

9. The optical imaging lens assembly according to claim 1, wherein $1.01 \leq DT31/DT21<1.4$,
where DT21 is a maximum effective radius of an object-side surface of the second lens, and DT31 is a maximum effective radius of an object-side surface of the third lens.

10. The optical imaging lens assembly according to claim 1, wherein $TTL/ImgH \leq 1.33$,
where TTL is a distance along the optical axis from an object-side surface of the first lens to an imaging plane of the optical imaging lens assembly, and ImgH is half of a diagonal length of an effective pixel area on the imaging plane of the optical imaging lens assembly.

11. An optical imaging lens assembly, sequentially from an object side to an image side of the optical imaging lens assembly along an optical axis, comprising:
a first lens having positive refractive power and a concave image-side surface;
a second lens having refractive power and a concave image-side surface;
a third lens having refractive power;
a fourth lens having refractive power;
a fifth lens having positive refractive power;
a sixth lens having refractive power, a convex object-side surface and a concave image-side surface; and
a seventh lens having refractive power and a concave object-side surface,
wherein $f/EPD \leq 2$, $$-1.3<R13/f<-0.3, \text{ and}$$

$$0<T23/T12<0.7,$$

where f is a total effective focal length of the optical imaging lens assembly, EPD is an entrance pupil diameter of the optical imaging lens assembly, R13 is a radius of curvature of the object-side surface of the seventh lens, T12 is a spaced interval between the first lens and the second lens along the optical axis, and T23 is a spaced interval between the second lens and the third lens along the optical axis.

12. The optical imaging lens assembly according to claim 11, wherein $0.6<TTL/f1<1.3$,
where TTL is a distance along the optical axis from an object-side surface of the first lens to an imaging plane of the optical imaging lens assembly, and f1 is an effective focal length of the first lens.

13. The optical imaging lens assembly according to claim 11, wherein $0<f/f5<1$,
where f5 is an effective focal length of the fifth lens.

14. The optical imaging lens assembly according to claim 11,
wherein $0.5<|f7/f|<1.3$,
where f7 is an effective focal length of the seventh lens.

15. The optical imaging lens assembly according to claim 11, wherein $0<|R11-R12|/|R11+R12|<0.5$,
where R11 is a radius of curvature of the object-side surface of the sixth lens, and R12 is a radius of curvature of the image-side surface of the sixth lens.

16. The optical imaging lens assembly according to claim 11, wherein $0.2<R1/R4<0.7$,
where R1 is a radius of curvature of an object-side surface of the first lens, and R4 is a radius of curvature of an image-side surface of the second lens.

17. The optical imaging lens assembly according to claim 11, wherein $1.01 \leq DT31/DT21<1.4$,
where DT21 is a maximum effective radius of an object-side surface of the second lens, and DT31 is a maximum effective radius of an object-side surface of the third lens.

* * * * *